US010284649B2

(12) United States Patent
Nagashima

(10) Patent No.: US 10,284,649 B2
(45) Date of Patent: May 7, 2019

(54) DISTRIBUTED PROCESSING SYSTEM

(71) Applicant: NEC Corporation, Tokyo (JP)

(72) Inventor: Hiroko Nagashima, Tokyo (JP)

(73) Assignee: NEC CORPORATION, Minato-Ku, Tokyo (JP)

( * ) Notice: Subject to any disclaimer, the term of this patent is extended or adjusted under 35 U.S.C. 154(b) by 738 days.

(21) Appl. No.: 14/893,952

(22) PCT Filed: Apr. 7, 2014

(86) PCT No.: PCT/JP2014/001992
§ 371 (c)(1),
(2) Date: Nov. 25, 2015

(87) PCT Pub. No.: WO2014/192213
PCT Pub. Date: Dec. 4, 2014

(65) Prior Publication Data
US 2016/0119425 A1 Apr. 28, 2016

(30) Foreign Application Priority Data
May 31, 2013 (JP) .................................. 2013-115489

(51) Int. Cl.
H04L 29/08 (2006.01)
G06F 12/0888 (2016.01)
(Continued)

(52) U.S. Cl.
CPC .......... H04L 67/1097 (2013.01); G06F 9/528 (2013.01); G06F 12/0888 (2013.01); H04L 67/2847 (2013.01); H04L 67/42 (2013.01)

(58) Field of Classification Search
CPC . H04L 67/1097; H04L 67/2847; H04L 67/42; G06F 9/528; G06F 12/0888
See application file for complete search history.

(56) References Cited

U.S. PATENT DOCUMENTS 7,228,350 B2 * 6/2007 Hong ..................... H04L 29/06 370/389
7,987,217 B2 * 7/2011 Long ...................... H04L 29/06 707/774

(Continued)

FOREIGN PATENT DOCUMENTS

| JP | 2006-235736 A | 9/2006 |
|----|---------------|--------|
| JP | 2013-45356 A  | 3/2013 |
| WO | 2007/063945 A1 | 6/2007 |

OTHER PUBLICATIONS

Teruki Sukenari et al., "Big Data no Katsuyo ni Saiteki na Scale Out-gata Shin Database 'InfoFrame Relational Store'", NEC Technical Journal, Sep. 1, 2012, pp. 30-33, vol. 65, No. 2.
(Continued)

Primary Examiner — Philip J Chea
Assistant Examiner — Wuji Chen
(74) Attorney, Agent, or Firm — Sughrue Mion, PLLC

(57) ABSTRACT

The server device includes a cache, and identification information of data used in a previously executed transaction. The server device compares identification information of data to be used in a transaction received from a client, with the identification information held by it. When the comparison result shows a mismatch, the server device executes the transaction after updating the cache by using data acquired from a persistent storage device, while when the comparison result shows a match, the server device executes the transaction without updating the cache. Then, the server device determines whether optimistic exclusion succeeded or failed, and in the case of failure, re-executes the transaction after updating the data in the cache by using the data acquired from the persistent storage device.

17 Claims, 21 Drawing Sheets

(51) Int. Cl.
  *G06F 9/52* (2006.01)
  *H04L 29/06* (2006.01)

(56) References Cited

U.S. PATENT DOCUMENTS

| | | | | |
|---|---|---|---|---|
| 9,166,862 | B1* | 10/2015 | Davis | H04L 29/06047 |
| 2002/0035673 | A1* | 3/2002 | Roseborough | G06F 17/3048 |
| | | | | 711/129 |
| 2002/0073232 | A1* | 6/2002 | Hong | H04L 29/06 |
| | | | | 709/238 |
| 2002/0078174 | A1* | 6/2002 | Sim | G06F 17/30194 |
| | | | | 709/219 |
| 2002/0198883 | A1* | 12/2002 | Nishizawa | G06F 17/30902 |
| 2003/0191812 | A1* | 10/2003 | Agarwalla | G06F 17/30902 |
| | | | | 709/217 |
| 2003/0200197 | A1* | 10/2003 | Long | H04L 29/06 |
| 2006/0123199 | A1* | 6/2006 | White | G06F 12/0815 |
| | | | | 711/141 |
| 2006/0212524 | A1* | 9/2006 | Wu | H04L 67/1095 |
| | | | | 709/206 |
| 2009/0307275 | A1 | 12/2009 | Miyashita et al. | |
| 2010/0095064 | A1* | 4/2010 | Aviles | H04L 67/1097 |
| | | | | 711/118 |
| 2012/0324472 | A1* | 12/2012 | Rossbach | G06F 9/467 |
| | | | | 718/106 |
| 2013/0055269 | A1 | 2/2013 | Sukenari | |
| 2013/0144736 | A1* | 6/2013 | Vodopia | G07G 1/0045 |
| | | | | 705/20 |
| 2013/0145010 | A1* | 6/2013 | Luna | H04W 40/248 |
| | | | | 709/223 |
| 2013/0325927 | A1* | 12/2013 | Corbett | G06F 17/30442 |
| | | | | 709/203 |
| 2015/0019686 | A1* | 1/2015 | Backholm | H04L 47/32 |
| | | | | 709/217 |
| 2015/0215314 | A1* | 7/2015 | Pisharody | H04L 63/0861 |
| | | | | 726/7 |
| 2016/0371355 | A1* | 12/2016 | Massari | G06F 17/30321 |

OTHER PUBLICATIONS

International Search Report for PCT/JP2014/001992 dated Jul. 1, 2014.

* cited by examiner

FIG. 3

| | FIRST RELATED ART OF PRESENT INVENTION | | SECOND RELATED ART OF PRESENT INVENTION | | | EMBODIMENT OF PRESENT INVENTION | | |
|---|---|---|---|---|---|---|---|---|
| | CACHE UPDATE | OPTIMISTIC EXCLUSION | RE-EXECUTION | CACHE UPDATE | OPTIMISTIC EXCLUSION | RE-EXECUTION | CACHE UPDATE | OPTIMISTIC EXCLUSION | RE-EXECUTION |
| TX1 | — | × | ○ | ○ | ○ | — | ○ | ○ | — |
| TX2 | — | ○ | — | ○ | ○ | — | — | ○ | — |
| TX3 | — | ○ | — | ○ | ○ | — | — | ○ | — |
| TX4 | — | ○ | — | ○ | ○ | — | — | ○ | — |
| TX5 | — | ○ | — | ○ | ○ | — | — | ○ | — |
| TX6 | — | ○ | — | ○ | ○ | — | — | ○ | — |
| TX7 | — | ○ | — | ○ | ○ | — | — | ○ | — |
| TX8 | — | × | ○ | ○ | ○ | — | ○ | ○ | — |
| TX9 | — | × | ○ | ○ | ○ | — | ○ | ○ | — |
| TX10 | — | × | ○ | ○ | ○ | — | ○ | ○ | — |

FIG. 9

| ID | UNIT PRICE | NUMBER OF UNITS | TOTAL |
|---|---|---|---|
| 1 | 100 | 2 | 200 |
| 2 | 50 | 8 | 400 |
| 3 | 100 | 10 | 1000 |

FIG. 16

PARTICULAR DATA DISTRIBUTION DESTINATION LIST

| PROCESSING ANALYSIS SERVER | P1 | P2 |
|---|---|---|
| <u>ID</u> | 2 | 1 |

PRIORITY : HIGH ←——————→ PRIORITY : LOW

DISTRIBUTED PROCESSING SYSTEM

CROSS REFERENCE TO RELATED APPLICATIONS

This application is a National Stage of International Application No. PCT/JP2014/001992 filed Apr. 7, 2014, claiming priority based on Japanese Patent Application No. 2013-115489 filed May 31, 2013, the contents of all of which are incorporated herein by reference in their entirety.

TECHNICAL FIELD

The present disclosure relates to a distributed processing system, a server device, a transaction execution method, and a program.

BACKGROUND

Recently, as mobile phones and the Internet have been widely used, the amount of data to be handled is increased. As such, it is required to process a large amount of data at a higher speed. In such a situation, as a system for storing a large amount of data, a demand for a key value store (KVS) is increasing. In a key value store, data (value) is associated with a unique sign (key), and they are stored in a pair. Hereinafter, data in which a key and a value are paired is called KV data. In particular, a system having a function in which units of KV data are stored distributedly in a plurality of servers, storage devices, and the like is called a distributed KVS. A distributed KVS focuses on scalability and throughput. As such, it has been unsuitable for a system requiring data consistency and a system involving transaction processing. However, due to needs for analysis and transaction processing of a larger amount of data, it is required to perform high-speed processing on a larger amount of data, while keeping data consistency, even in a distributed KVS.

As techniques for improving data processing capability, use of a cache and a simultaneous execution control method for transactions have been known. Use of a cache is a technique of storing frequently used data in a high-speed storage device to thereby realize high-speed processing by eliminating wasteful processing of reading it every time from a low-speed persistent storage device. On the other hand, a simultaneous execution control method for transactions is a technique of executing, in parallel, a plurality of transactions of updating the same information, while keeping data consistency.

It has been known that simultaneous execution control methods for transactions include a method based on pessimistic exclusion and a method based on optimistic exclusion. In a simultaneous execution control method based on pessimistic exclusion, before execution of a transaction, every data to be referred to or updated in such a transaction is excluded (locked) in advance to thereby secure the data consistency. However, in simultaneous execution control based on pessimistic exclusion, as processing of another server using the same data cannot be performed until processing by the server executing the processing obtaining exclusion, which lacks scalability. As such, in a distributed key value store focusing on scalability, a simultaneous execution control method based on optimistic exclusion is used

SUMMARY

It is an aspect to provide a distributed processing system in which simultaneous execution control based on optimistic exclusion and use of a cache are combined. It is another aspect to provide a distributed processing system in which both the cost for cache update and the cost for re-execution of a transaction are reduced, while maintaining scalability.

According to an aspect of one or more exemplary embodiments, there is provided a distributed processing system comprising a client device that transmits a transaction; a persistent storage device that stores data; and a plurality of server devices configured to control execution of the transaction received from the client device based on optimistic exclusion. Each of the server devices comprises a cache that holds the data acquired from the persistent storage device; an identification information holding unit that holds identification information of data used in a previously executed transaction; and a transaction execution unit. The transaction execution unit compares identification information of data required for execution of the transaction received from the client device, with the identification information of the data held in the identification information holding unit, and when a comparison result shows a mismatch, after updating the cache by acquiring the data stored in the persistent storage device, the transaction execution unit executes the transaction by using the data in the cache, while when the comparison result shows a match, the transaction execution unit executes the transaction by using the data in the cache without updating the cache with the data in the persistent storage device, and then determines whether the optimistic exclusion succeeded or failed, and in the case of failure, the transaction execution unit re-executes the transaction after updating the data in the cache by using the data stored in the persistent storage device.

According to another aspect of one or more exemplary embodiments, there is provided a server device connected with a client device that transmits a transaction and a persistent storage device that stores data, and configured to control execution of the transaction received from the client device based on optimistic exclusion. The server device comprises a cache that holds the data acquired from the persistent storage device; an identification information holding unit that holds identification information of data used in a previously executed transaction; and a transaction execution unit. The transaction execution unit compares identification information of data required for execution of the transaction received from the client device with the identification information of the data held in the identification information holding unit, and when a comparison result shows a mismatch, after updating the cache by acquiring the data stored in the persistent storage device, the transaction execution unit executes the transaction by using the data in the cache, while when the comparison result shows a match, the transaction execution unit executes the transaction by using the data in the cache without updating the cache with the data in the persistent storage device, and then determines whether the optimistic exclusion succeeded or failed, and in the case of failure, the transaction execution unit re-executes the transaction after updating the data in the cache by using the data stored in the persistent storage device.

According to another aspect of one or more exemplary embodiments, there is provided a transaction execution method performed by a server device connected with a client device that transmits a transaction and a persistent storage device that stores data. The server device includes a cache that holds the data acquired from the persistent storage device and an identification information holding unit that holds identification information of data used in a previously executed transaction, and is configured to control execution of the transaction received from the client device based on optimistic exclusion. The method includes comparing identification information of data required for execution of the transaction received from the client device, with the identification information of the data held in the identification information holding unit; when a comparison result shows a mismatch, after updating the data in the cache by using the data stored in the persistent storage device, executing the transaction by using the data in the cache, while when the comparison result shows a match, executing the transaction by using the data in the cache without updating the cache with the data in the persistent storage device; and determining whether the optimistic exclusion succeeded or failed, and in the case of failure, re-executing the transaction after updating the data in the cache by using the data stored in the persistent storage device.

According to another aspect of one or more exemplary embodiments, there is provided a program that causes a computer, which is connected with a client device that transmits a transaction and a persistent storage device that stores data and is configured to control execution of the transaction received from the client device based on optimistic exclusion, to function as a cache that holds the data acquired from the persistent storage device; an identification information holding unit that holds identification information of data used in a previously executed transaction; and a transaction execution unit, wherein the transaction execution unit compares identification information of data required for execution of the transaction received from the client device with the identification information of the data held in the identification information holding unit, and when a comparison result shows a mismatch, after updating the cache by acquiring the data stored in the persistent storage device, the transaction execution unit executes the transaction by using the data in the cache, while when the comparison result shows a match, the transaction execution unit executes the transaction by using the data in the cache without updating the cache with the data in the persistent storage device, and then determines whether the optimistic exclusion succeeded or failed, and in the case of failure, the transaction execution unit re-executes the transaction after updating the data in the cache by using the data stored in the persistent storage device.

BRIEF DESCRIPTION OF DRAWINGS

FIG. 3 is a diagram in which the first exemplary embodiment of the present invention and first related art and second related art of the present invention are compared regarding presence/absence of cache update before execution of a transaction, a possibility of success in optimistic exclusion, and a possibility of re-execution of a transaction.

FIG. 9 is a diagram showing an exemplary table stored in the database server according to the second exemplary embodiment of the present invention.

FIG. 16 is a diagram showing an example of a specific data distribution destination list in the fourth exemplary embodiment of the present invention.

DETAILED DESCRIPTION

A distributed processing system in which both use of a cache and simultaneous execution control of transactions based on optimistic exclusion has been proposed. However, in a distributed processing system in which simultaneous execution control based on optimistic exclusion and use of a cache are combined, if the data in the cache used for a transaction is not the latest, a commit of the transaction fails and the transaction is re-executed. As such, the processing performance of the distributed processing system deteriorates. In order to avoid this deterioration, if the cache is updated every time before execution of a transaction, the probability that optimistic exclusion succeeds is increased and the frequency of re-execution of the transaction is decreased. However, the cost for cache update is increased in turn, so there is no reason to have a cache in the first place. Meanwhile, if the cache is not updated before execution of a transaction, while the cost for cache update can be reduced, the probability that optimistic exclusion fails is increased, and the cost for re-execution of a transaction is increased. As such, it is difficult to reduce both the cost for cache update and the cost for re-execution of a transaction.

As a scheme for holding latest data in a cache of each server, there is a method of exchanging latest cache data between servers. However, as this method needs to connect the respective servers over a network, an operation not requiring communications (data or information exchange) between servers cannot be performed. Further, if the respective servers are not independent from each other, processing cannot be performed in parallel. As such, there are disadvantages that the number of transactions which can be executed simultaneously is reduced so that the processing performance degraded, and when the amount of data to be processed is increased, it is difficult to add servers only. Accordingly, it is difficult to apply a method of exchanging latest cache data between servers to distributed key value store which focuses on scalability. As such, it is advantageous to have a scheme capable of using a cache of a server effectively while keeping data consistency by optimistic exclusion control with independent servers.

Next, exemplary embodiments will be described in detail with reference to the drawings.

First Exemplary Embodiment

Figure 1:
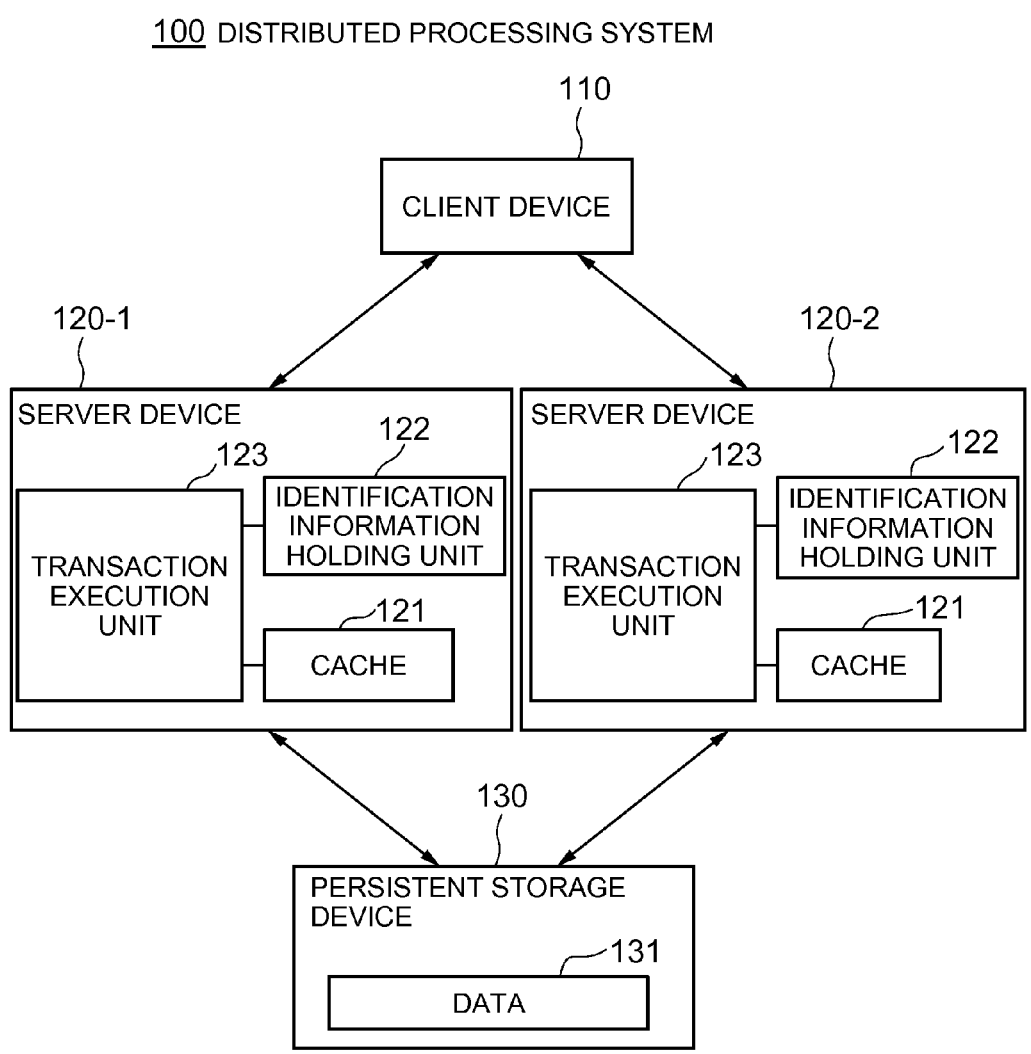
FIG. 1 is a block diagram of a distributed processing system according to a first exemplary embodiment of the present invention.

Referring to FIG. 1, a distributed processing system 100, according to a first exemplary embodiment of the present invention, includes a client device 110, server devices 120, and a persistent storage device 130.

The client device 110 is a device which transmits a transaction to any one of the server devices 120. The client device 110 may be a dedicated or a general-purpose computer equipped with a CPU, memories such as ROM, RAM, and the like, an external storage device which stores various types of information, an input/output interface, a communication interface, and a bus connecting them with each other. The number of client devices 110 may be plural.

The persistent storage device 130 has a function of storing data 131. The persistent storage device 130 may be a database controllable by optimistic exclusion such as a Berkley DB, a key value store, a relational database, or the like. The number of persistent storage devices 130 may be plural. The data 131 to be stored in the persistent storage device 130 is stored appropriately in a database of the type described above according to a data storage method (key value method, relational model method, or the like) thereof. For example, in the case of a key value store, the data 131 includes KV data and version information. KV data is a pair of a key and a value. Version information represents the version of the KV data. Hereinafter, while description will be given based on the premise that the data 131 includes KV data and version information, the present invention is not limited to data in such a form.

The server device 120 is a device which controls execution of a transaction received from the client device 110 based on optimistic exclusion. The server device 120 may be a dedicated or general-purpose computer equipped with a CPU, memories such as ROM, RAM, and the like, an external storage device which stores various types of information, an input/output interface, a communication interface, and a bus connecting them with each other. While the number of server devices 120 is two in FIG. 1, three or more server devices 120 may be acceptable.

Each of the server devices 120 includes a cache 121, an identification information holding unit 122, and a transaction execution unit 123.

The cache 121 has a function of holding a copy of the data 131 acquired from the persistent storage device 130. The cache 121 is configured of a readable/writable memory such as a RAM. While the capacity of the cache 121 is arbitrary, it is desirable that the cache 121 has the capacity capable of holding at least the maximum amount of data to be used in one transaction.

The identification information holding unit 122 has a function of holding identification information of the data 131 used in the transaction previously executed by the server device 120. The identification information of the data 131 may be a key value if the data 131 is KV data. The identification information holding unit 122 is configured of a readable/writable memory such as a RAM. While the capacity of the identification information holding unit 122 is arbitrary, it is desirable that the identification information holding unit 122 has the capacity capable of holding at least the maximum amount of data to be used in one transaction.

The transaction execution unit 123 has a function of executing a transaction. The transaction execution unit 123 may be realized by the CPU constituting the server device 120 and software executed by the CPU. A plurality of transaction execution unit 123 may be provided on the same server device 120.

The transaction execution unit 123 has functions as describe below. First, the transaction execution unit 123 has a function of analyzing a transaction received from the client device 110, and comparing identification information of the data 131 required for the execution with the identification information of the data 131 held in the identification information holding unit 122. The transaction execution unit 123 also has a function of, when the comparison result shows a mismatch, acquiring the data 131 stored in the persistent storage device 130 and updating the cache, and then executing the transaction using the data 131 in the cache 121. The transaction execution unit 123 also has a function of, when the comparison result shows a match, executing the transaction using the data 131 in the cache 121, without updating the cache 121 with the data in the persistent storage device 130. The transaction execution unit 123 also has a function of determining whether optimistic exclusion succeeded or failed after execution of the transaction. The transaction execution unit 123 also has a function of committing the transaction when the optimistic exclusion succeeded, and transmitting the execution result of the transaction to the client device 110. On the other hand, when the optimistic exclusion failed, the transaction execution unit 123 has a function of re-executing the transaction after updating the data 131 in the cache 121 by using the data 131 stored in the persistent storage device 130.

Next, operation of the present embodiment will be described.

Figure 2:
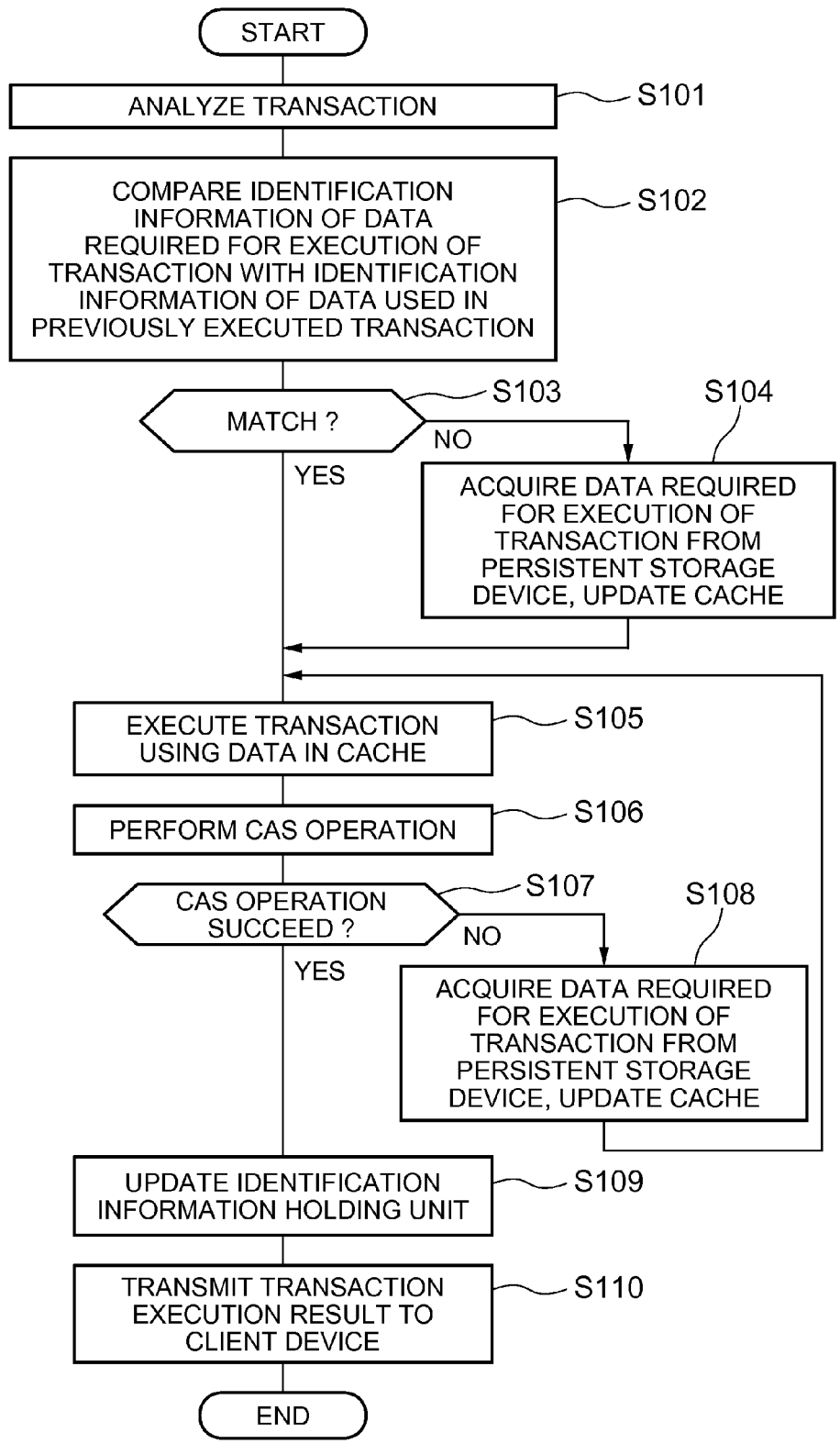
FIG. 2 is a flowchart showing an exemplary operation of a server device in the distributed processing system according to the first exemplary embodiment of the present invention.

The client device 110 transmits a transaction to any one of the server devices 120. The server device 120, which received the transaction, analyzes and executes the transaction. At that time, the server device 120 refers to or updates the data 131 stored in the persistent storage device 130, if necessary, based on optimistic exclusion. When the optimistic exclusion succeeded, the server device 120 transmits the execution result of the transaction to the client device 110. On the other hand, when the optimistic exclusion failed, the server device 120 re-executes the transaction. Hereinafter, operation of the server device 120 will be described in detail with reference to the flowchart of FIG. 2.

When the transaction execution unit 123 of the server device 120 receives a transaction from the client device 110, the transaction execution unit 123 analyzes it (step S101).

Then, the transaction execution unit 123 reads identification information of the data 131 used in the previously executed transaction from the identification information holding unit 122, and compares it with the identification information of the data 131 to be used in the transaction to be executed currently (step S102). Then, if the comparison result shows a mismatch (NO at step S103), the transaction execution unit 123 acquires the data 131 required for execution of the current transaction from the persistent storage device 130, and updates the cache 121 (step S104). This means that the transaction execution unit 123 copies the data 131 acquired from the persistent storage device 130 to the cache 121, and proceeds to the processing of step S105. On the other hand, if the comparison result shows a match (YES at step S103), the transaction execution unit 123 skips step S104, and proceeds to the processing of step S105.

At step S105, the transaction execution unit 123 executes the transaction using the data 131 in the cache 121. Specifically, if the transaction is to update the value of the data 131, for example, the transaction execution unit 123 updates the value of the data 131 in the cache 121.

Next, the transaction execution unit 123 determines whether or not optimistic exclusion succeeded or failed, by performing CAS operation (steps S106, S107). Specifically, if the transaction is to update the value of the data 131, the transaction execution unit 123 determines whether or not the version information of the data 131 in the cache 121 is the same as the version information of the data 131 in the persistent storage device 130 (compare processing of CAS operation), and if they match, the transaction execution unit 123 determines that commit of the transaction succeeded, and writes the data 131 in the cache 121 after the update into the persistent storage device 130 while incrementing the version information (swap processing of CAS operation). On the other hand, if both pieces of version information do not match and CAS operation failed, the transaction execution unit 123 determines that commit of the transaction failed. In that case, the transaction execution unit 123 again acquires the latest data 131 required for execution of the transaction from the persistent storage device 130 and updates the cache 121 (step S108). This means that the transaction execution unit 123 copies the data 131, acquired from the persistent storage device 130, to the cache 121. Then, the transaction execution unit 123 proceeds to the processing of step S105, and re-executes the transaction. The loop processing of these steps S105 to S108 are repeated until the CAS operation succeeds, that is, until the optimistic exclusion succeeds.

Then, when the CAS operation succeeded (YES at step S107), the transaction execution unit 123 updates the identification information holding unit 122 by using the identification information of the data used in the transaction (step S109), transmits the execution result of the transaction to the client device 110 (step S110), and ends the processing relating to the received transaction.

Next, advantageous effects of the present embodiment will be described.

According to the present embodiment, it is possible to reduce both the cost for cache update and the cost for re-execution of a transaction, while securing the scalability.

The grounds that the scalability can be secured are that as a method of holding latest data in the cache 121 of each server device 120, a method of acquiring latest data from the persistent storage device 130 is used, rather than a method of exchanging latest cache data between servers, so that the respective server devices 120 are independent from each other.

The grounds that both the cost for cache update and the cost for re-execution of a transaction can be reduced are that it is determined whether or not to perform cache update before execution of a transaction based on whether or not identification information of the data to be used in the transaction matches the identification information of the data used in the previous transaction. As such, it is possible to reduce the frequency of wasteful cache update which may be performed even though the data in the cache is the latest, while it is possible to reduce the frequency of re-execution of a transaction which must be performed if the transaction was executed without updating the cache even though the data in the cache is not the latest.

FIG. 3 is a diagram in which the present embodiment of the present invention and first related art and the second related art of the present invention are compared, regarding presence/absence of cache update before execution of a transaction, a possibility of success of optimistic exclusion, and a possibility of re-execution of a transaction. In the figure, a sign "-" shown in the fields of cache update represents that cache update is not performed, and a sign "o" represents that cache update is performed, respectively. Further, a sign "o" shown in the fields of optimistic exclusion represents that a probability of success in optimistic exclusion is high, and a sign "x" represents that a probability of failure in optimistic exclusion is high, respectively. Further, a sign "-" shown in the fields of re-execution represents that a possibility of re-execution of a transaction is low, and a sign "o" represents that a possibility of re-execution of a transaction is high, respectively.

The first related art of the present invention, which is a comparative target, is a method in which cache update is not performed at all times if the data 131 required for a transaction exists in the cache. The second related art of the present invention is a method in which cache update is always performed before execution of a transaction. Further, as a series of transactions to be executed, transactions from the first transaction TX1 to the seventh transaction TX7 are handled as transactions using the data 131 of the same identification information, and the eighth to tenth transactions, namely transactions TX8, TX9, and TX10, are handled as transactions using the data 131 of identification information different from that of the other transactions.

As shown in FIG. 3, in the first related art of the present invention, while the cost for updating the cache 121 is the smallest, as cache update is not performed in the first transaction TX1, the probability of failure in optimistic exclusion and performing re-execution is high. Further, as cache update is not performed in the eighth to tenth transactions, the probability of failure in optimistic exclusion and performing re-execution is also high. In the second to seventh transactions, the grounds for a low probability of re-execution due to success in optimistic exclusion, even though cache update is not performed, are that the latest data used in the transaction, performed immediately before, is held in the cache 121.

Further, as shown in FIG. 3, in the second related art of the present invention, cache update is performed every time. As such, while a probability of success in optimistic exclusion and not performing re-execution is the highest, the cost for updating the cache is the highest.

Meanwhile, in the method according to the present embodiment, the cost for cache update is largely lowered compared with the second related art of the present invention, although a probability of success in optimistic exclusion and not having to perform re-execution is similar to that of the second related art. This is because when the data in the cache seems to be the latest, that is, when the identification information of the data to be used for a transaction matches the identification information of the data used in the previous transaction, wasteful cache update is avoided, as described above.

Second Exemplary Embodiment

Next, a second exemplary embodiment of the present invention will be described.

Figure 4:
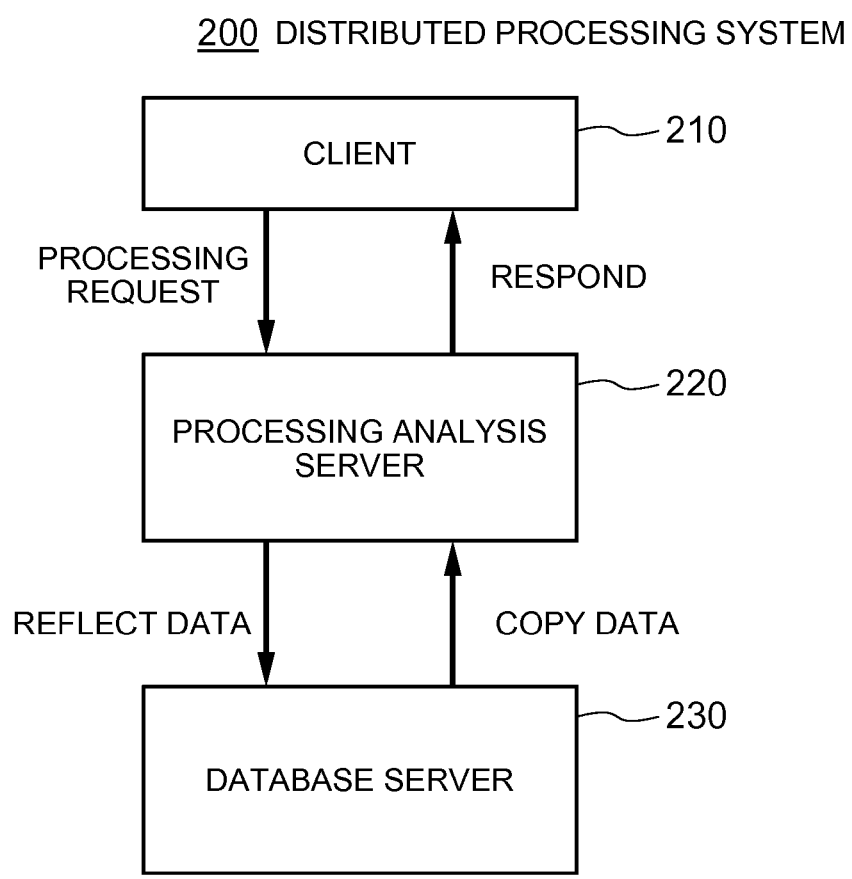
FIG. 4 is a diagram showing the overview of a distributed processing system according to a second exemplary embodiment of the present invention.

Referring to FIG. 4, a distributed processing system 200 according to the present embodiment includes a client 210, a processing analysis server 220, and a database server 230.

In the distributed processing system 200 according to the present embodiment, the client 210 first transmits a processing request to the processing analysis server 220. In this example, one processing request corresponds to one transaction. The processing analysis server 220, which received the processing request from the client 210, analyzes the processing request, copies necessary latest data from the database server 230, and performs update/reference processing. Upon completion of processing according to the received processing request, the processing analysis server 220 sends back a reply to the client 210. While every processing according to the processing request between the client 210 and the processing analysis server 220 and between the processing analysis server 220 and the database server 230 is performed in parallel, data consistency is not lost. Further, the processing request is not transmitted directly from the client 210 to the database server 230.

Figure 5:
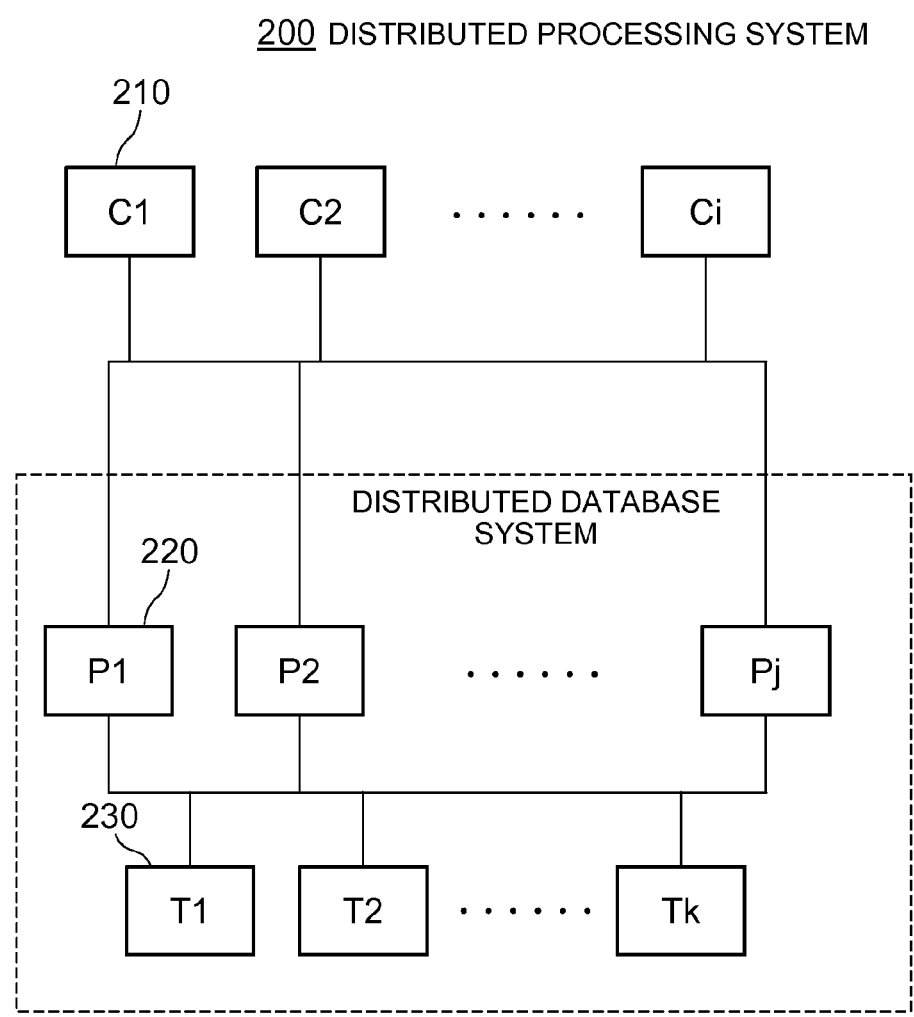
FIG. 5 is a block diagram of the distributed processing system according to the second exemplary embodiment of the present invention.

FIG. 5 shows a more detailed configuration of the distributed processing system 200 according to the present embodiment. Referring to FIG. 5, the distributed processing system 200 according to the present embodiment is a distributed database system including i (i represents one or larger integer) pieces of clients (C) 210. The distributed database system includes j (j represents one or larger integer) pieces of processing analysis servers (P) 220 and k (k represents one or larger integer) pieces of database servers (T) 230. As the respective clients 210 are connected with all of the processing analysis servers 220, it is possible to transmit a processing request to any of the processing analysis servers 220. Further, as the respective processing analysis servers 220 are connected with the entire database servers 230, it is possible to transmit a processing request to any of the database servers 230.

Figure 6:
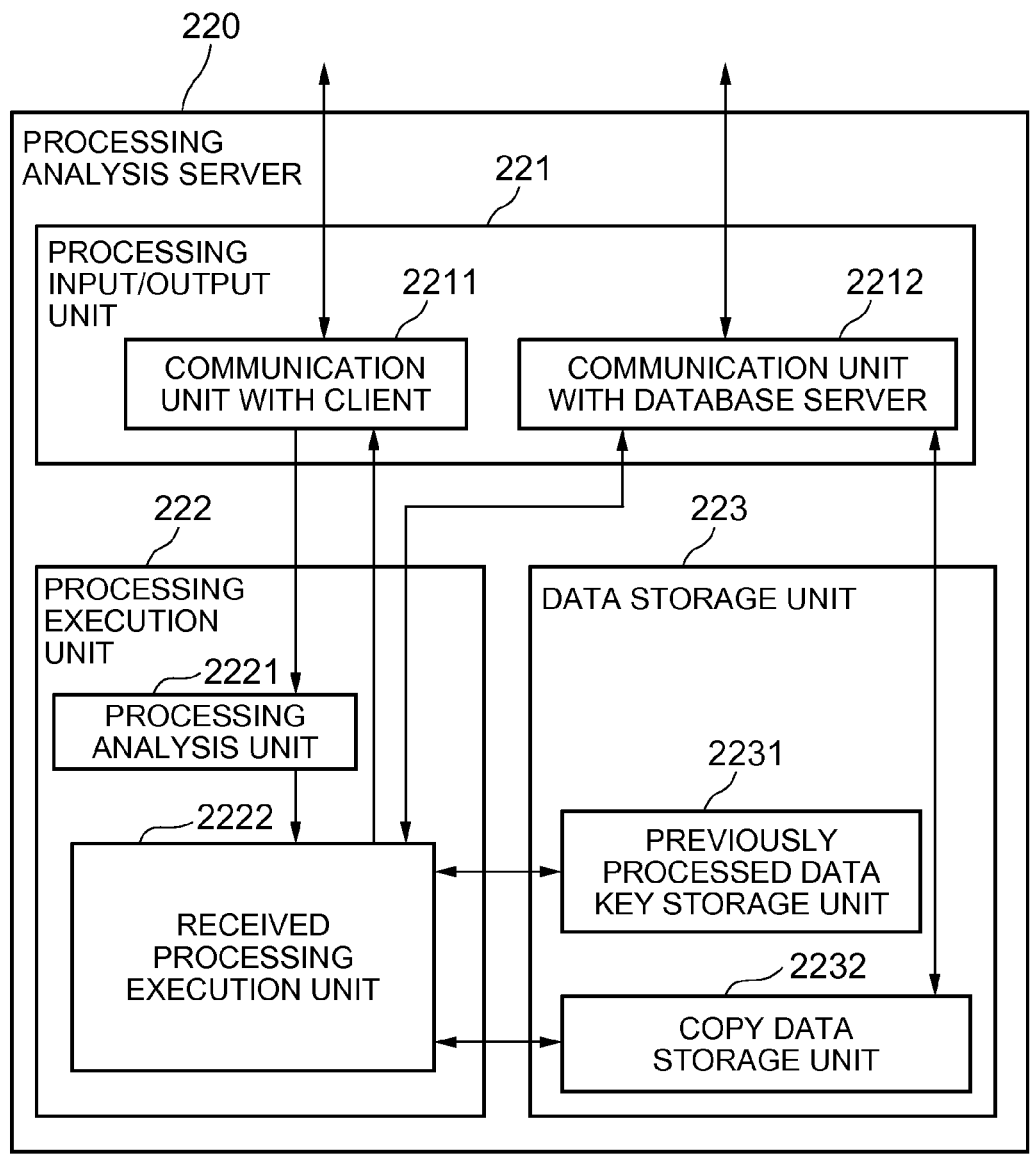
FIG. 6 is a block diagram of a processing analysis server according to the second exemplary embodiment of the present invention.

FIG. 6 is a block diagram of the processing analysis server 220. The processing analysis server 220 includes a processing input/output unit 221, a processing execution unit 222, and a data storage unit 223. The processing input/output unit 221 includes a communication unit 2211 with clients, and a communication unit 2212 with database servers, and performs transmission and reception of processing requests, data, and the like with other functional servers. The processing execution unit 222 includes a processing analysis unit 2221 which analyzes a received processing request, and a received processing execution unit 2222 which actually executes processing according to the processing request. The data storage unit 223 includes a previously processed data key storage unit 2231 which stores a main key of data used in the previous processing request, and a copy data storage unit 2232 as a cache which stores data copied from the database server 230.

Figure 7:
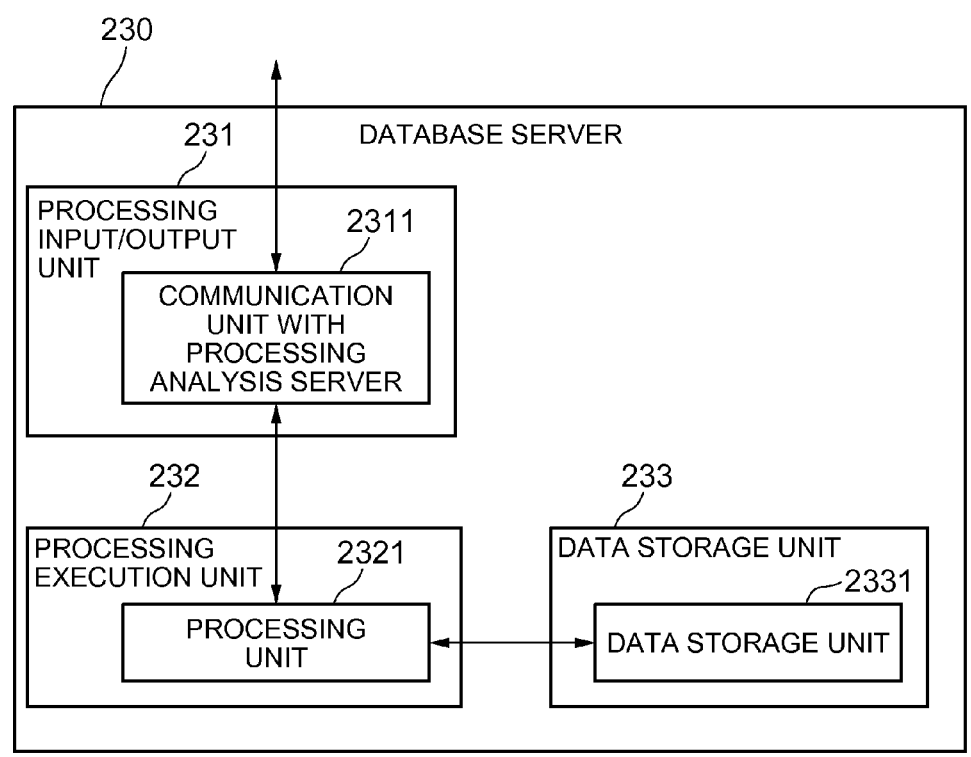
FIG. 7 is a block diagram of a database server according to the second exemplary embodiment of the present invention.

FIG. 7 is a block diagram of the database server 230. Similar to the processing analysis server 220, the database server 230 includes a processing input/output unit 231, a processing execution unit 232, and a data storage unit 233. The processing input/output unit 231 includes a communication unit 2311 with processing analysis servers. As the database server 230 does not communicate with the client 210, there is no communication unit corresponding to the communication unit 2211 with clients in the processing analysis server 220. The processing execution unit 232 includes a processing unit 2321 which actually executes processing. The data storage unit 233 includes a data storage unit 2331 which stores latest data. Data to be stored in the data storage unit 2331 includes KV data and version information.

Next, operation of the present embodiment will be described focusing on a processing analysis server.

First, outline of the operation will be described. If a received processing request is processing which uses data (record) having a main key which is the same as the main key of the data used in the previous processing request, the processing analysis server 220 does not copy data from the database server 230 but performs processing on the data stored in the copy data storage unit 2232 in the own server. Upon completion of the processing, the processing analysis server 220 checks the version of the data in the database server 230. If the data in the own server is the latest data, the processing analysis server 220 allows the processing result to be reflected on the database server 230 and returns the result to the client 210 in the case of update processing. In the case of reference processing, the processing analysis server 220 directly returns the result to the client.

In this way, if subsequent processing is processing to be performed on the same data, the processing analysis server 220 performs processing on the data stored in the own server to thereby be able to eliminate a time required for copying data from the database server 230 and improve the processing performance.

Figure 8:
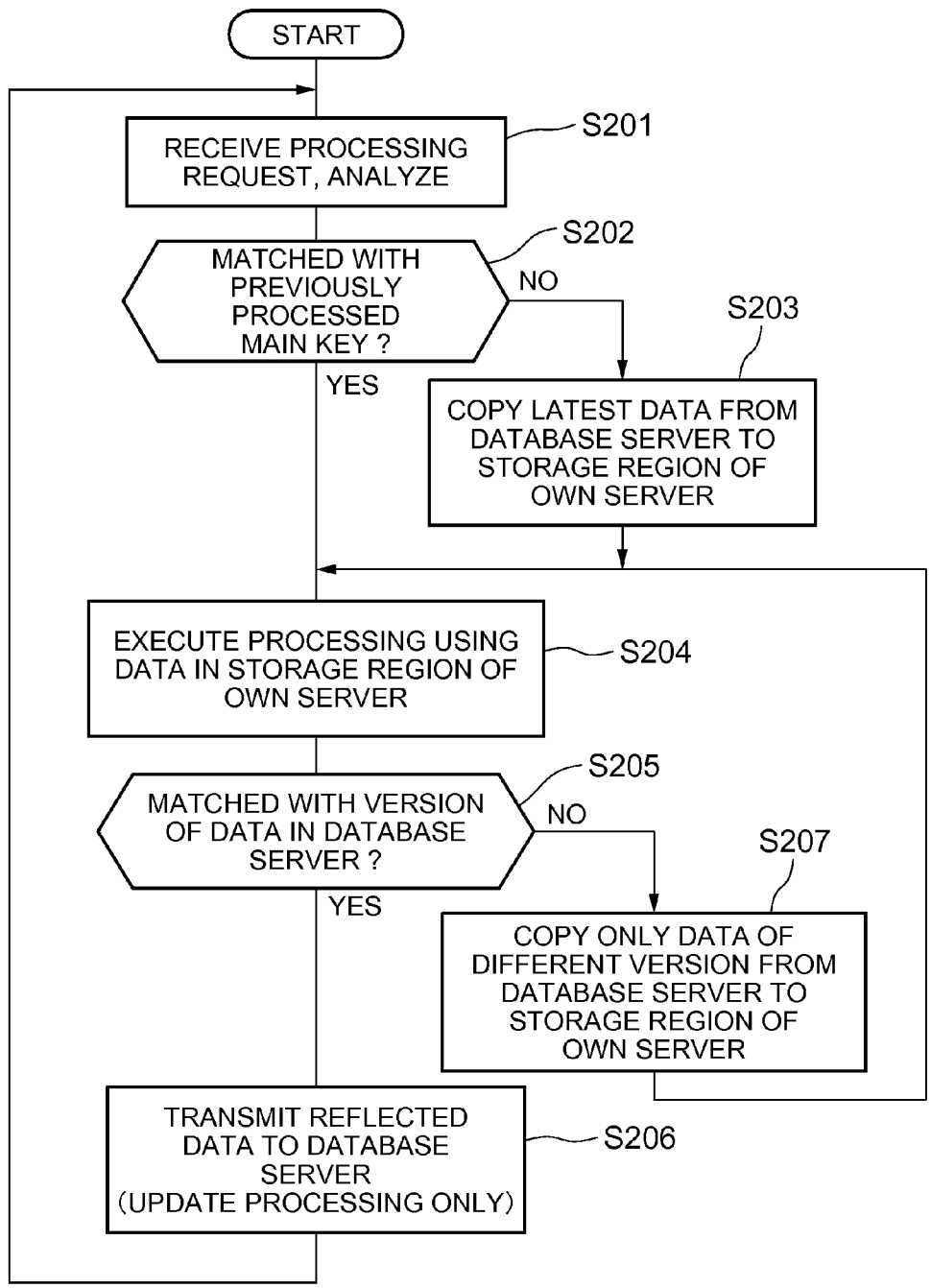
FIG. 8 is a flowchart showing an operation of a processing analysis server according to the second exemplary embodiment of the present invention.

Next, the operation will be described in more detail. FIG. 8 is a flowchart showing the operation of the processing analysis server 220. FIG. 9 shows an exemplary table stored in the data storage unit 2331 of the database server 230. In this example, while only one table is provided for the sake of easy description, the present invention is applicable to the case of a plurality of tables. In the table, the main key of the data is ID (underlined part).

Hereinafter, description will be given on an operation in the case where the following processing requests (transactions) "a" to "d" are received from a client device in this order.

(a) Update the number of units of data of ID=1
(b) Update the number of units of data of ID=1
(c) Update unit price of data of ID=2
(d) Refer to the number of units of data of ID=2

First, the processing analysis unit 2221 of the processing analysis server 220 receives a processing request "a" from the client 210 and analyzes ID and the like of the data to be used (step S201 of FIG. 8). Then, the received processing execution unit 2222 of the processing analysis server 220 checks whether or not the ID of the data, processed previously and stored in the previously processed data key storage unit 2231, and the ID of the data to be used in the currently received processing request "a" match (step S202). As the processing request "a" is the first one and they do not match, the received processing execution unit 2222 copies the latest data from the data storage unit 233 of the database server 230 to the copy data storage unit 2232 of the data storage unit 223 in the own server (step S203). Then, the received processing execution unit 2222 executes processing of the processing request "a" by using the data in the copy data storage unit 2232 (step S204). Then, as the update request "a" is update processing, the received processing execution unit 2222 allows the update result to be reflected on the database server through CAS operation (steps S205 and S206). If the data has been updated through updating from another server by the optimistic exclusion control (NO at step S205), the CAS operation results in error, and the update result is not reflected on the database server 230. In that case, the received processing execution unit 2222 copies only data having been updated at the time of error from the database server 230 to the copy data storage unit 2232, again (step S207). Then, the received processing execution unit 2222 re-executes the processing according to the processing request "a" (step S204). Then, if the processing according to the processing request "a" ends successfully without fail in optimistic exclusion control, the processing analysis server 220 returns to the processing of step S201.

Next, the processing analysis unit 2221 of the processing analysis server 220 receives a processing request "b" from the client 210 and analyzes it (step S201). As the ID of the data used in the processing request "a", having been processed previously, and the ID of the data to be used in the currently received processing request "b" match (YES at step S202), the received processing execution unit 2222 of the processing analysis server 220 performs processing on the data stored in the copy data storage unit 2232 of the data storage unit 223 of the own server (step S204). As the processing request "b" is update processing, after performing the processing, the received processing execution unit 2222 allows the processing result to be reflected on the data in the database server 230 (steps S205 and S206).

Next, the processing analysis unit 2221 of the processing analysis server 220 receives a processing request "c" from the client 210 and analyzes it (step S201). As the ID of the data used in the processing request "b", having been processed previously, and the ID of the data to be used in the currently received processing request "c" differ from each other (NO at step S202), similar processing as that performed with reference to the processing request "a" is performed subsequently.

Next, the processing analysis unit 2221 of the processing analysis server 220 receives a processing request "d" from the client 210 (step S201). As the ID of the data used in the processing request "c", having been processed previously, and the ID of the data to be used in the currently received processing request "d" match (YES at step S202), the received processing execution unit 2222 of the processing analysis server 220 performs processing on the data stored in the copy data storage unit 2232 of the data storage unit 223 in the own server. As the processing request "d" is reference processing, there is no need to allow the data to be reflected on the database server 230. However, there is a possibility that the value of the data referred to has been updated by another processing analysis server, depending on the time. As such, before sending back the result to the client 210, the received processing execution unit 2222 checks the version of the data in the database server 230. If it is confirmed that the version of the data is the latest, the received processing execution unit 2222 sends back the result to the client. If it has been updated by another processing analysis server (NO at step S205), the received processing execution unit 2222 copies only the updated data from the database server 230 to the own server, and re-executes processing of the processing request "d".

In this way, the processing analysis server 220 determines whether or not the data used in the processing request having been processed immediately before and the data to be used in the currently received processing request have the same main key, and if not, acquires the latest data from the database server 230 to the copy data storage unit 2232 in the data storage unit 223 in the own server, while if they are the same, skips the acquisition processing described above and performs processing on the data stored in the copy data storage unit 2232 of the own server.

Hereinafter, an operation when processing results in error due to optimistic exclusion control will be described in more detail.

Figure 10:
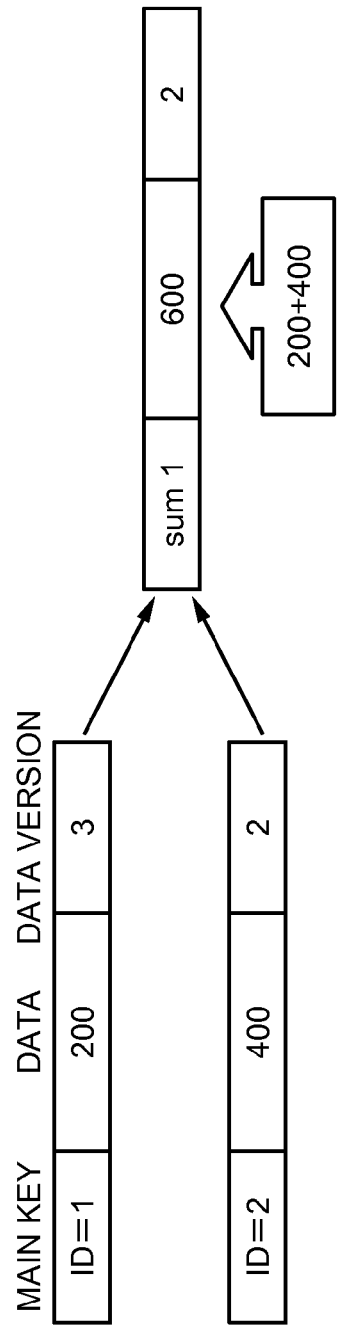
FIG. 10 is a diagram showing exemplary processing of a transaction according to the second exemplary embodiment of the present invention.

For example, as shown in FIG. 10, it is assumed that there is processing to perform addition processing using data of ID=1 and data of ID=2, and based on the addition result, update data in which the main key is sum 1. The processing analysis server 220 performs processing according to a processing request received from the client 210, and then attempts to allow the result to be reflected on the database server 230. At this time, the processing analysis server 220 collates the versions of the respective units of data of ID=1, ID=2, and sum 1 on the own server with the versions of the respective units of data of ID=1, ID=2, and sum 1 on the database server 230. Now, if the version of the data of ID=2 was updated by another processing analysis server from 2 to 3 while the versions of the respective units of data of ID=1 and sum 1 remain 3 and 2, the processing analysis server 220 only copies data of ID=2 from the database server 230 to the own server. Further, if the versions of the respective units of data of ID=1 and ID=2 differ, the processing analysis server 220 copies the respective units of data of ID=1 and ID=2. In this way, the processing analysis server 220 only copies data of a different version. Then, the processing analysis server 220 performs processing, according to the processing request received from the client, on the copied data, again.

In this way, by copying not every data required for processing but only a difference at the time of error, it is possible to reduce the time taken for copying.

Next, advantageous effects of the present embodiment will be described.

According to the present embodiment, the processing analysis servers 220 are independent from each other because no communication is performed between the processing analysis servers 220. As such, it is possible to realize operation having scalability.

Identification information (main key in the present embodiment) of data, having been processed previously, is held in the processing analysis server 220, and whether or not to perform cache update is controlled depending on whether or not to process data of identification information which is the same as that of the previously processed data. As such, wasteful copying of processed data from the database server 230 is reduced, whereby the processing time of the entire system is reduced.

In the case where an error occurs due to optimistic exclusion control, as only data which causes the error is copied, the time taken for copying is reduced. Thereby, the possibility that re-processing causes an error again can be reduced. This means that if an error occurs due to optimistic exclusion control, in the method of deleting the entire data once and acquiring new data, in the case where errors occur in a plurality of processing analysis servers at once, the possibility of updating the entire data again would be high. By copying only a difference at the time of error as in the present embodiment, as a difference is caused in the data copying time between the processing analysis servers, there is a possibility that no error occurs depending on the timing.

Third Exemplary Embodiment

Figure 11:
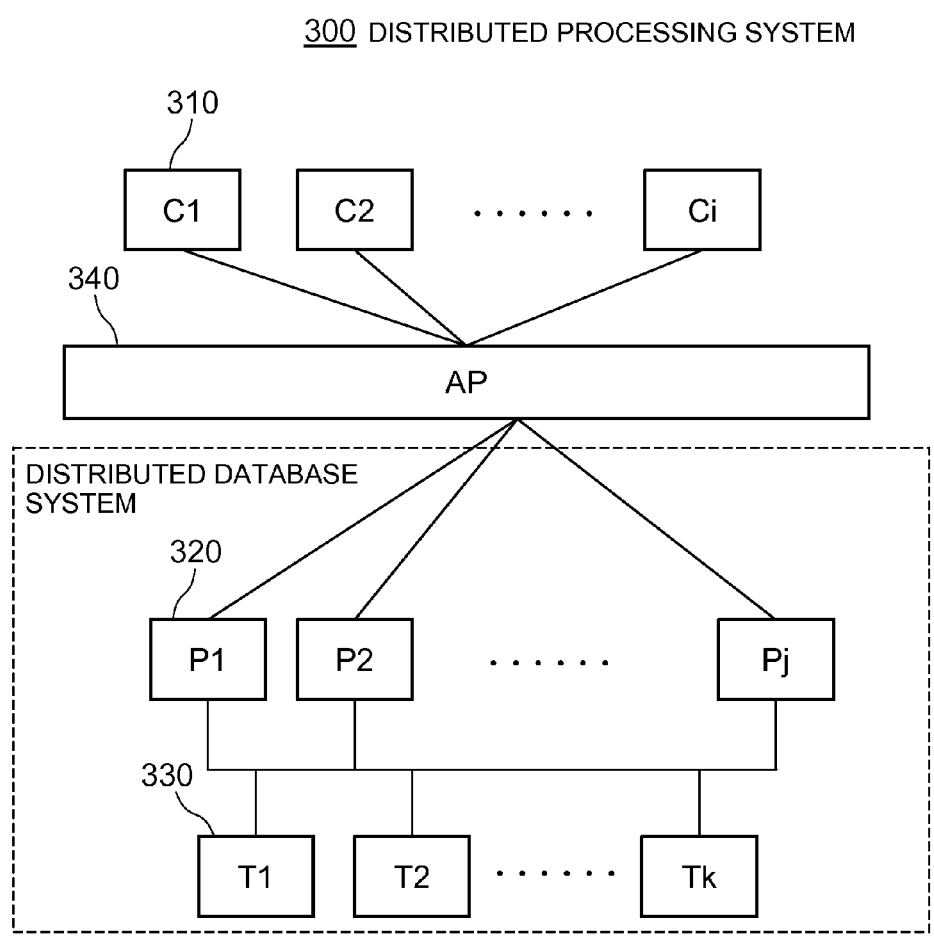
FIG. 11 is a block diagram of a distributed processing system according to a third exemplary embodiment of the present invention.

Referring to FIG. 11, a distributed processing system 300 according to a third exemplary embodiment of the present invention differs from the distributed processing system 200 of the second exemplary embodiment shown in FIG. 5 in that a distribution device 340 is disposed between clients 310 and processing analysis servers 320. The distribution device 340 receives processing requests from the clients 310, and distributes the received processing requests to the processing analysis servers 320.

The client 310, the processing analysis server 320 and a database server 330 are the same as the client 210, the processing analysis server 220, and the database server 230 of the second exemplary embodiment shown in FIG. 5.

Figure 12:
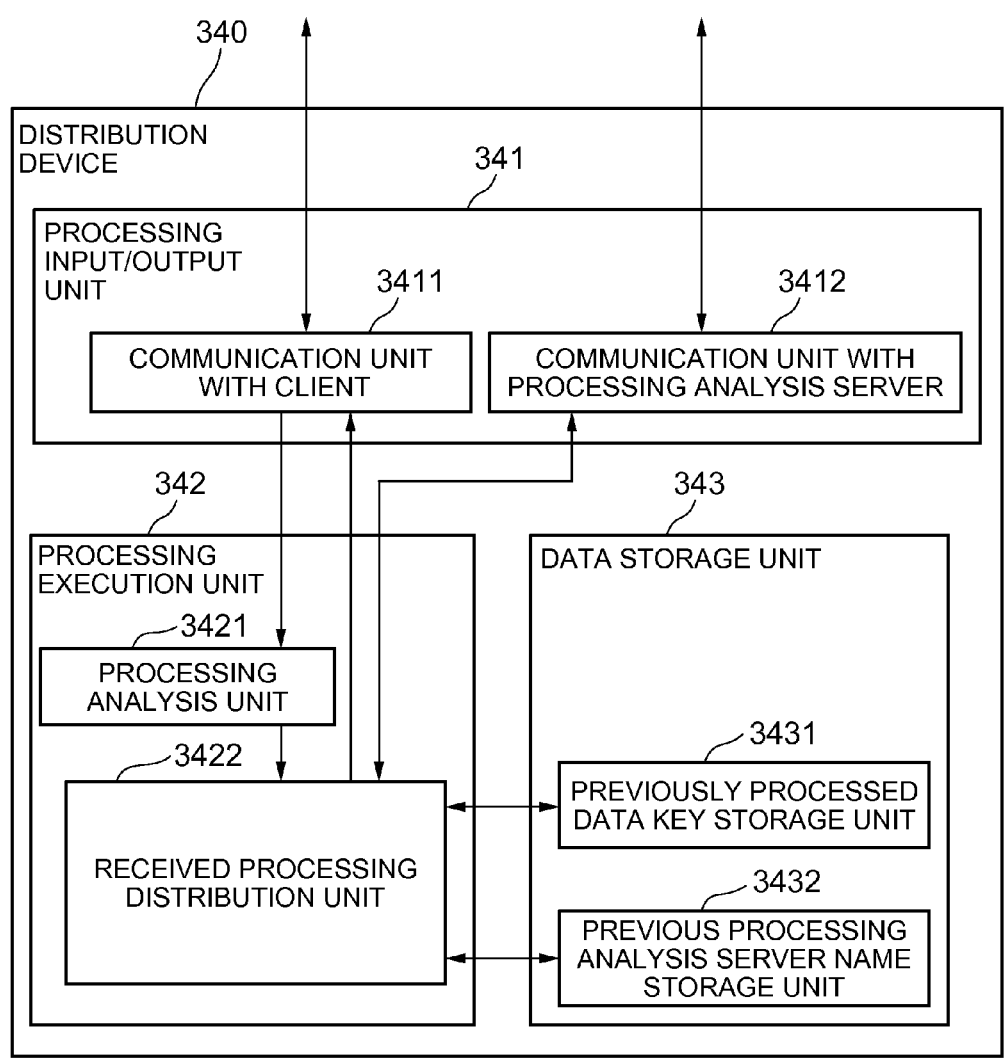
FIG. 12 is a block diagram of a distribution device according to the third exemplary embodiment of the present invention.

Referring to FIG. 12, the distribution device 340 includes a processing input/output unit 341, a processing execution unit 342, and a data storage unit 343. The processing input/output unit 341 includes a communication unit 3411 with clients and a communication unit 3412 with processing analysis servers, and performs transmission and reception of processing requests and data with all of the clients 310 and the processing analysis servers 320. The processing execution unit 342 includes a processing analysis unit 3421 which analyzes a received processing request, and a received processing distribution unit 3422 which distributes a received processing request to any one of the processing analysis servers 320. The data storage unit 343 includes a previously processed data key storage unit 3431 which stores the main key of the data used in a previously distributed processing request, and a previous processing analysis server name storage unit 3432 which stores identification information (for example, name) of the processing analysis server 320 to which the processing request was distributed previously.

Next, operation of the present embodiment will be described. Operations of the client 310, the processing analysis server 320, and the database server 330 are the same as those of the client 210, the processing analysis server 220, and the database server 230 of the second exemplary embodiment shown in FIG. 5. Hereinafter, description will be given mainly on the operation of the distribution device 340.

Figure 13:
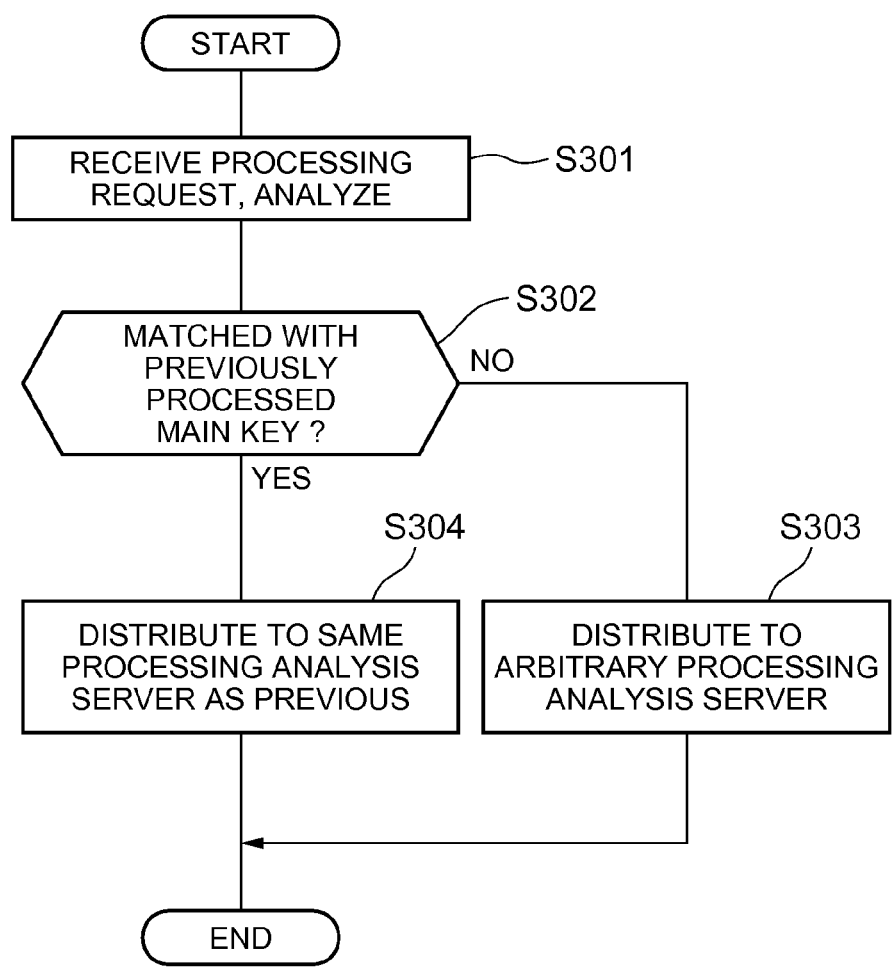
FIG. 13 is a flowchart showing an operation of the distribution device according to the third exemplary embodiment of the present invention.

FIG. 13 is a flowchart showing the operation of the distribution device 340. The processing analysis unit 3421 of the distribution device 340 receives a processing request from any of the clients 310, analyzes it, and transmits an analysis result such as ID of the data to be used to the received processing distribution unit 3422 (step S301). Then, the received processing distribution unit 3422 determines whether or not the main key of the data to be used in the processing request matches the main key of the data used in the previously processed processing request (step S302). Specifically, the received processing distribution unit 3422 reads the main key of the data used in the previously processed processing request from the previously processed data key storage unit 3431, and compares it with the main key of the data to be used in the currently received processing request. As a result of comparison, if they do not match, the received processing distribution unit 3422 distributes the currently received processing request to any one of the processing analysis servers 320 (step S303). At this time, the received processing distribution unit 3422 stores the main key of the data to be used in the currently received processing request in the previously processed data key storage unit 3431, and stores the name of the processing analysis server 320, which is the current distribution destination, in the previous processing analysis server name storage unit 3432. On the other hand, as a result of comparison, if they match, the received processing distribution unit 3422 refers to the previous processing analysis server name storage unit 3432 and confirms the processing analysis server 320 as the previous distribution destination, and distributes the currently received processing request to such a processing analysis server 320 (step S304).

Hereinafter, operation will be described in the case where the following processing requests "a" to "c" reach the distribution device 340 from the client 310 in this order.
(a) Update the number of units of data of ID=1
(b) Update unit price of data of ID=2
(c) Update the number of units of data of ID=2

Upon receipt of a processing request "a", the distribution device 340 analyzes it, and checks whether or not the ID of the data used in the previously processing request and the ID of the data to be used in the currently received processing request "a" match. As the processing request "a" is the first one and there is no processing request before, they do not match. If they do not match, the distribution device 340 distributes the processing request "a" to an appropriate processing analysis server 320.

Next, when the distribution device 340 receives a processing request "b", the distribution device 340 analyzes it, and as the ID (=1) of the data used in the previously processed processing request "a" and the ID (=2) of the data to be used in the currently received processing request "b" differ from each other, the distribution device 340 distributes the processing request "b" to an appropriate processing analysis server 320.

Next, when the distribution device 340 receives a processing request "c", the distribution device 340 analyzes it, and as the ID (=2) of the data used in the previously processed processing request "a" and the ID (=2) of the data to be used in the currently received processing request "b" match, the distribution device 340 distributes the processing request "c" to the same processing analysis server 320 to which the previous processing request "b" was distributed. Accordingly, in the processing analysis server 320 which receives the processing request "c" following the processing request "b", as the processing requests "b" and "c" in which the main key of the data used in execution of the processing requests are input continuously, wasteful cache update operation is prevented.

As described above, the present embodiment includes the distribution device 340 which distributes processing requests from the clients to a plurality of processing analysis servers in such a manner that a plurality of processing requests in which the main key of the data to be used is the same are sequentially distributed to the same processing analysis server. As such, comparing with a configuration in which an arbitrary client transmits a processing request to an arbitrary processing analysis server, it is possible to reduce wasteful cache update in the processing analysis servers.

Fourth Exemplary Embodiment

Figure 14:
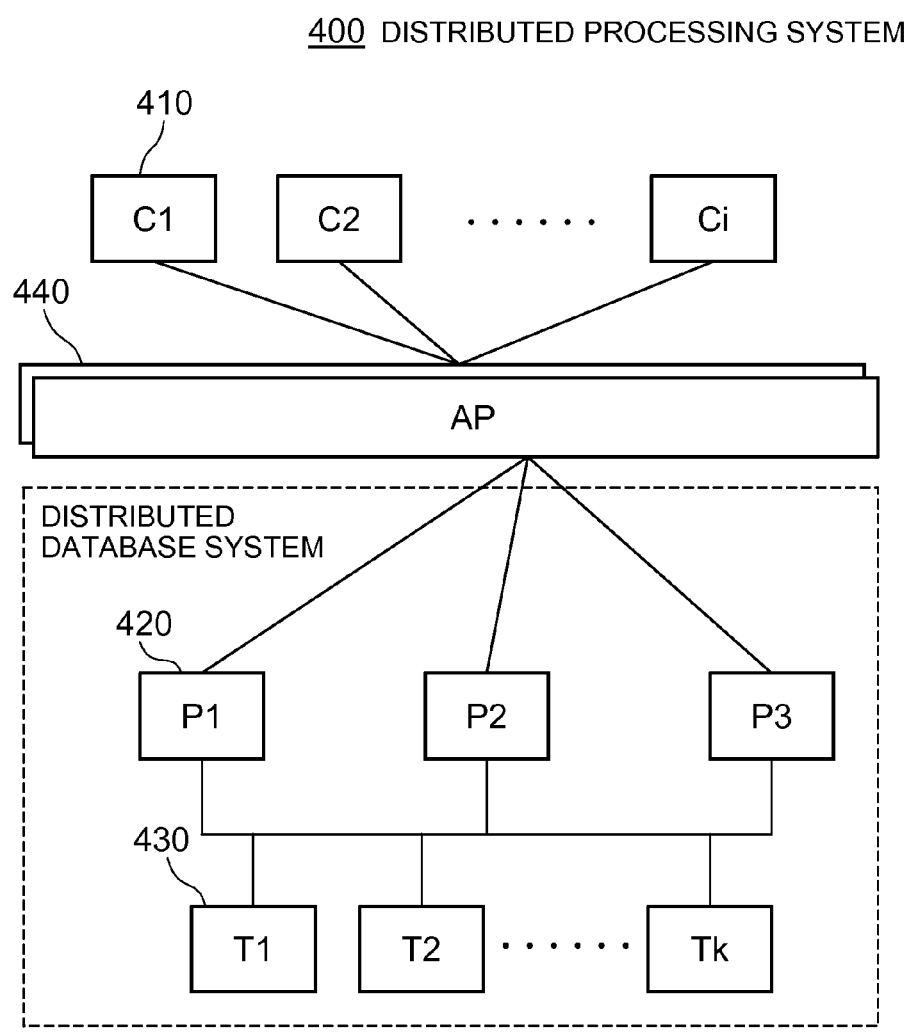
FIG. 14 is a block diagram of a distributed processing system according to a fourth exemplary embodiment of the present invention.

Referring to FIG. 14, a distributed processing system 400 according to a fourth exemplary embodiment of the present invention differs from the distributed processing system 200 of the second exemplary embodiment shown in FIG. 5 in that one or more distribution devices 440 are provided between clients 410 and processing analysis servers 420. The distribution device 440 receives processing requests from the clients 410 and distributes the received processing requests to the processing analysis servers 420. Further, in the distributed processing system 400 of the present embodiment, functions of the processing analysis server 420 differ partially from those of the processing analysis server 220 of the distributed processing system 200 of the second exemplary embodiment.

The client 410 and a database server 430 are the same as the client 210 and the database server 230 of the second exemplary embodiment shown in FIG. 5.

Figure 15:
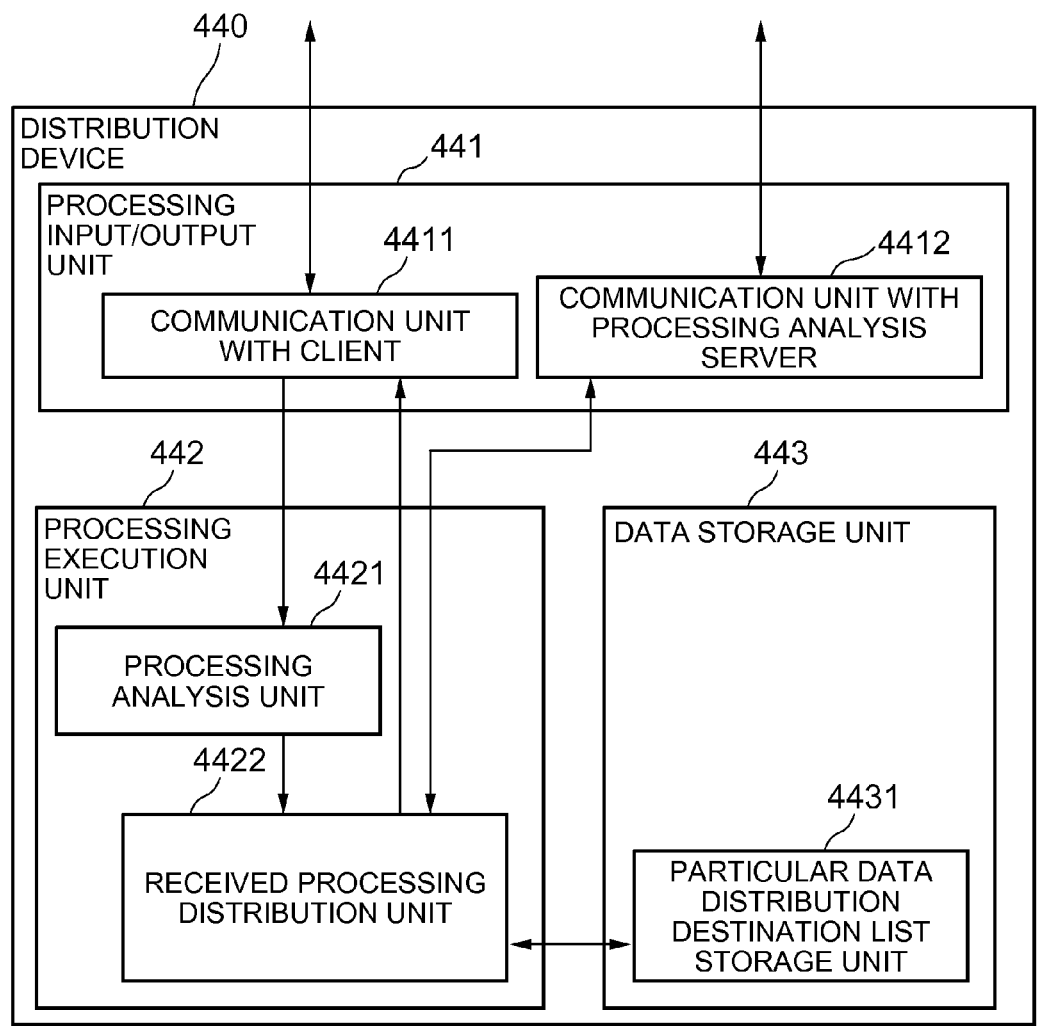
FIG. 15 is a block diagram of a distribution device according to the fourth exemplary embodiment of the present invention.

Referring to FIG. 15, the distribution device 440 includes a processing input/output unit 441, a processing execution unit 442, and a data storage unit 443. The processing input/output unit 441 includes a communication unit 4411 with clients and a communication unit 4412 with processing analysis servers, and transmits and receives processing requests and data with all of the clients 410 and the processing analysis servers 420. The processing execution unit 442 includes a processing analysis unit 4421 which analyzes a received processing request, and a received processing distribution unit 4422 which distributes a received processing request to any one of the processing analysis servers 420. The data storage unit 443 includes a particular data distribution destination list storage unit 4431.

The particular data distribution destination list storage unit 4431, in the data storage unit 443, stores a list describing a correspondence relationship between identification information of particular data and a processing analysis server which is a distribution destination of a processing request using such particular data. FIG. 16 is an exemplary configuration of a particular data distribution destination list. In this example, it is set that a processing request using data having ID=2, which is the main key, is distributed to the processing analysis server 420 specified by identification information P1. It is also set that a processing request using data having ID=1, which is the main key, is distributed to the processing analysis server 420 specified by identification information P2. Further, the particular data distribution destination list is configured such that information described on the left side has higher priority. Accordingly, in the example shown in FIG. 16, it is set that a processing request using both data having ID=1 and data having ID=2 is distributed to the processing analysis server 420 specified by the identification information P2. The processing analysis servers registered in the particular data distribution destination list are not necessarily the entire servers but may be part of the processing analysis servers. If there are a plurality of distribution devices 440, the particular data distribution destination lists of all distribution devices 440 have the same content.

Figure 17:
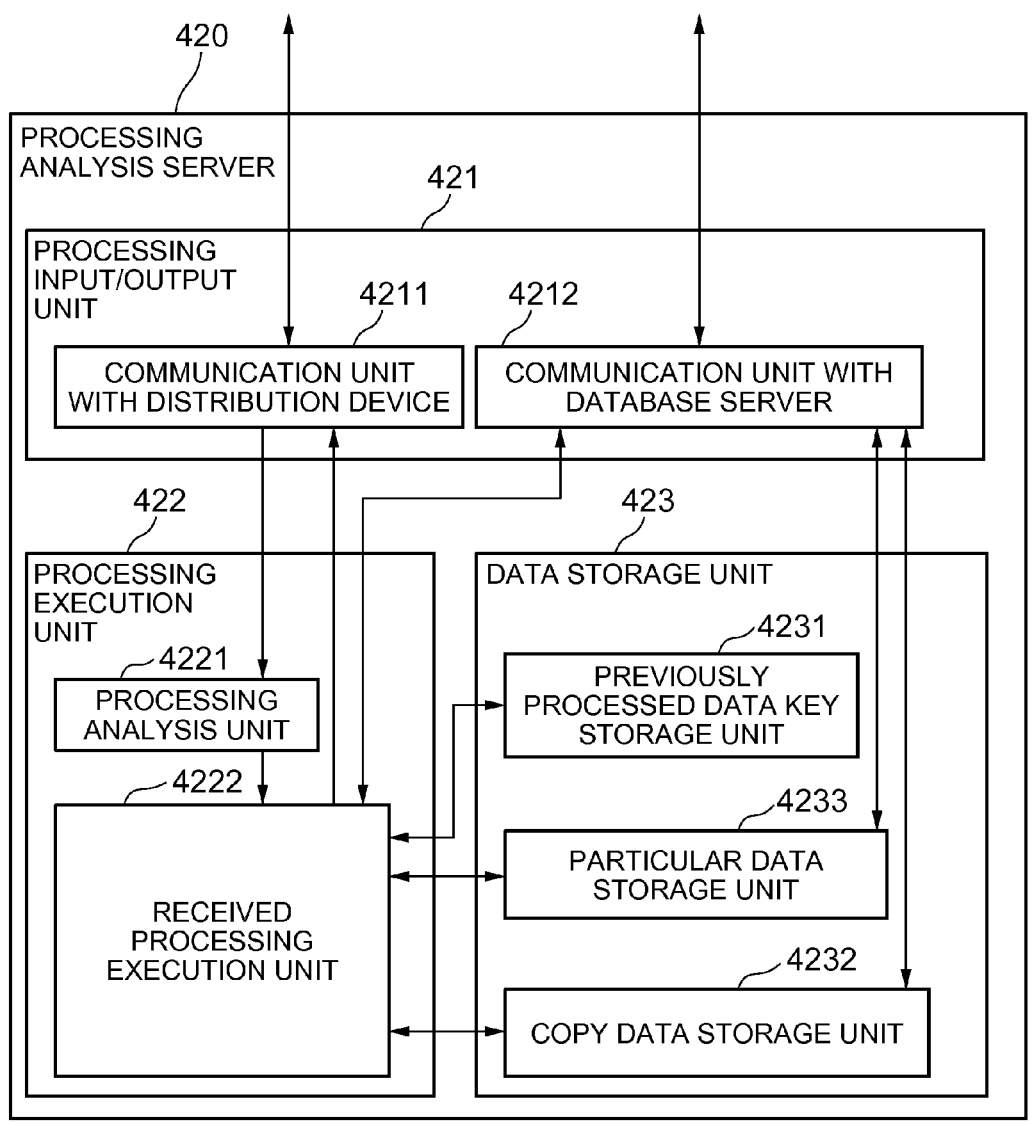
FIG. 17 is a block diagram of a processing analysis server according to the fourth exemplary embodiment of the present invention.

FIG. 17 is a block diagram of the processing analysis server 420. The processing analysis server 420 includes a processing input/output unit 421, a processing execution unit 422, and a data storage unit 423. The processing input/output unit 421 includes a communication unit 4211 with distribution devices, and a communication unit 4212 with database servers, and performs processing and transmission and reception of data with other functional servers. The processing execution unit 422 includes a processing analysis unit 4221 which analyzes a received processing request, and a received processing execution unit 4222 which actually performs processing according to the processing request. The data storage unit 423 includes a previously processed data key storage unit 4231 which stores the main key of the previously processed data, and a copy data storage unit 4232 as a cache which stores data copied from the database server 430, and a particular data storage unit 4233 as a cache which stores particular data copied from the database server 430. It is desirable that particular data acquired from a database server is stored in the particular data storage unit 4233 before execution of a series of transactions. It should be noted that in the present embodiment, a result of processing executed by the processing analysis server 420 is transmitted to the client which requested the processing through a distribution device. However, it is also possible to transmit a result of processing executed by the processing analysis server 420 directly from the processing analysis server 420 to the client which requested the processing without through a distribution device. In that case, the processing input/output unit 421 of the processing analysis server 420 includes a communication unit with clients.

Next, operation of the present embodiment will be described. Operations of the client 410 and the database server 430 are the same as those of the client 210 and the database server 230 of the second exemplary embodiment shown in FIG. 5. Hereinafter, description will be given focusing on operations of the distribution device 440 and the processing analysis server 420.

Figure 18:
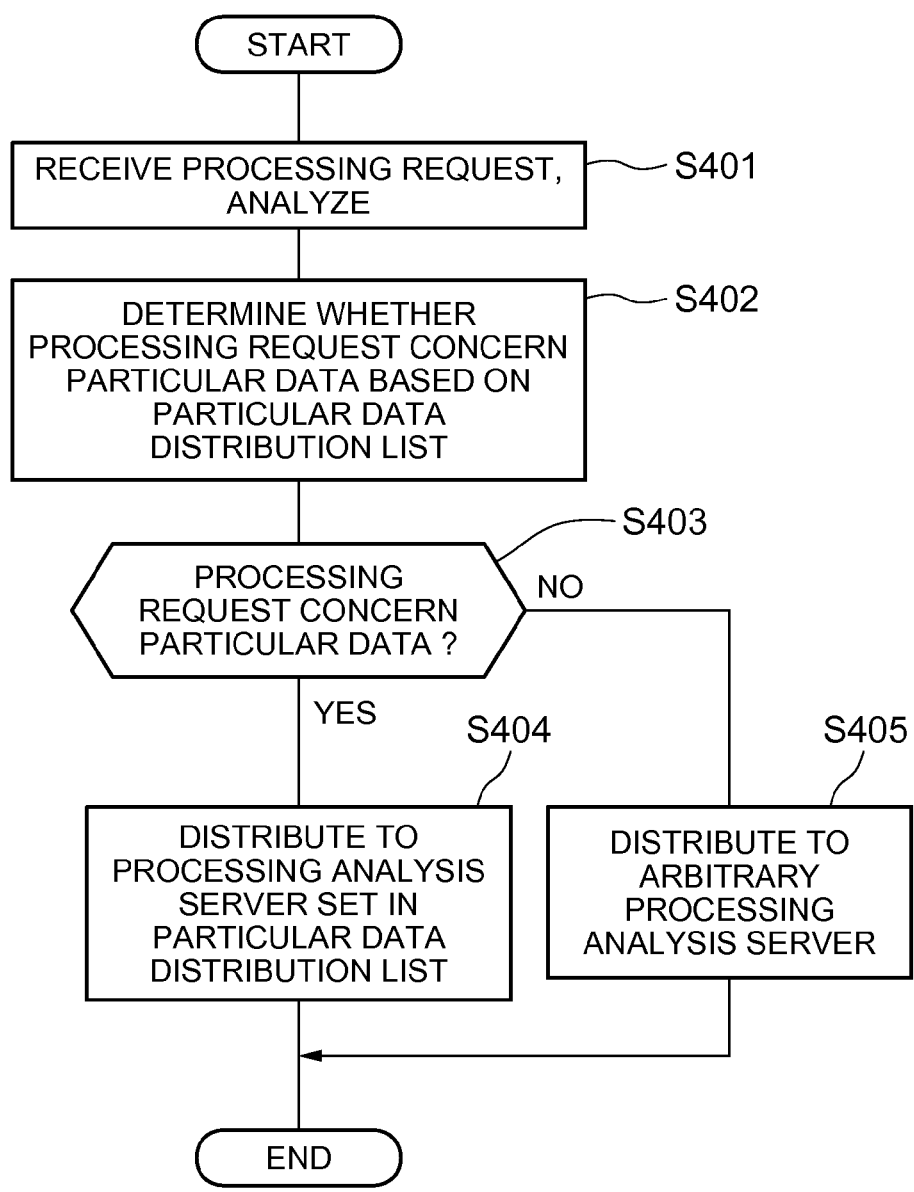
FIG. 18 is a flowchart showing an operation of the distribution device according to the fourth exemplary embodiment of the present invention.

FIG. 18 is a flowchart showing an operation of the distribution device 440. The processing analysis unit 4421 of the distribution device 440 receives a processing request from any of the clients 410, and analyzes the main key of the data to be used and the like (step S401). Then, the received processing distribution unit 4422 of the distribution device 440 determines whether or not the data to be used in the processing request is particular data. Specifically, the received processing distribution unit 4422 reads a particular data distribution destination list from the storage unit 4431, and collates the main key of each unit of particular data described in the list with the main key of the data to be used in the currently received processing request, in order from the top of the list (step S402). As a result of collation, if the data to be used in the currently received processing request is particular data described in the particular data distribution destination list (YES at step S403), the received processing distribution unit 4422 adds a particular data flag to the processing request, and distributes the currently received processing request to the processing analysis server 420 set in the particular data distribution destination list (step S404). On the other hand, as a result of collation, if it is determined that the processing request is not the one with respect to particular data, the received processing distribution unit 4422 distributes the currently received processing request to any one of the processing analysis servers 420 (step S405). In this case, a particular data flag is not added to the processing request.

Figure 19:
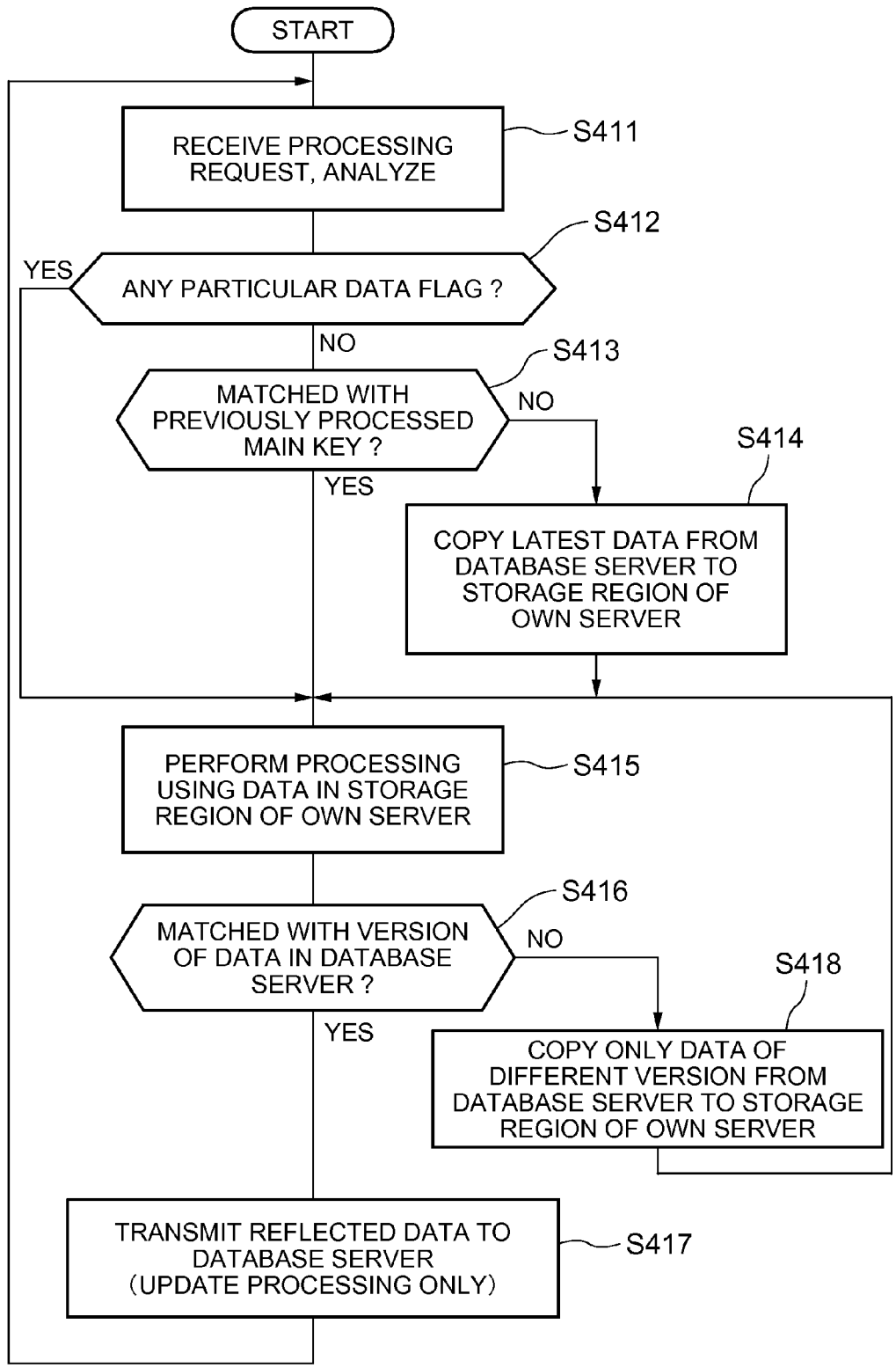
FIG. 19 is a flowchart showing an operation of a processing analysis server according to the fourth exemplary embodiment of the present invention.

FIG. 19 is a flowchart showing an operation of the processing analysis server 420. The processing analysis unit 4221 of the processing analysis server 420 receives a processing request from the distribution device 440, and analyzes the main key of the data to be used, presence or absence of a particular data flag, and the like (step S411). Then, based on the analysis result, the received processing execution unit 4222 of the processing analysis server 420 determines whether or not a particular data flag is added to the processing request (step S412). If a particular data flag is added, the received processing execution unit 4222 skips steps S413 and S414, and proceeds to the processing of step S415. If a particular flag data is not added to the processing request, the received processing execution unit 4222 checks whether or not the ID of the previously processed data stored in the previously processed data key storage unit 4231 and the ID of the data to be used in the currently received processing request match (step S413). If they do not match, the received processing execution unit 4222 copies the latest data from the database server 430 to the copy data storage unit 4232 of the data storage unit 423 in the own server (step S413), and then proceeds to the processing of step S415. If they match, the received processing execution unit 4222 skips the processing of step S414, and proceeds to the processing of step S415.

At step S415, the received processing execution unit 4222 of the processing analysis server 420 executes processing of the processing request by using data in the copy data storage unit 4232 and the particular data storage unit 4233. Subsequently, the processing analysis server 420 executes processing of steps S416 to S418 which are the same as steps S205 to S207 in FIG. 8 of the second exemplary embodiment.

Hereinafter, operation will be described in the case where the following processing requests "a" to "c" reach the distribution device 440 from the client 410 in this order.

(a) Update the number of units of data of ID=2
(b) Update the number of units of data of ID=3
(c) Update unit price of data of ID=1, update unit price of data of ID=2

When the distribution device 440 receives a processing request "a", the distribution device 440 checks a particular data distribution destination list. Referring to FIG. 16, data of ID=2 is particular data, and is set to be distributed to the processing analysis server 420 of identification information P1. As such, the distribution device 440 adds a particular data flag to the processing request "a", and distributes it to the processing analysis server 420 of the identification information P1. While a particular data flag is added to the processing request "a" in this example, it is also possible to add a particular data flag to ID=2 in the processing request "a".

The processing analysis server 420, which received the processing request "a" from the distribution device 440, checks presence or absence of a particular data flag, and as there is a particular data flag, executes processing on the data stored in the particular data storage unit 4233 of the own server, regardless of the previously processed data.

Next, when the distribution device 440 receives a processing request "b", the distribution device 440 checks the particular data distribution destination list. However, referring to FIG. 16, there is no ID=3. As such, the distribution device 440 distributes the processing request "b" to an appropriate one of the processing analysis servers 420.

The processing analysis server 420, which received the processing request "b" from the distribution device 440, checks presence or absence of a particular data flag, and as there is no particular data flag, executes processing which is same as that performed by the processing analysis server 220 in the second exemplary embodiment described with reference to FIG. 8.

Next, when the distribution device 440 receives a processing request "c", the distribution device 440 checks the particular data distribution destination list again. The processing request "c" is processing to be performed on two units of data having ID=1 and ID=2. Referring to FIG. 16, distributing the data of ID=2 to the identification information P1 has higher priority. Accordingly, the distribution device 440 adds a particular data flag to the processing request "c", and distributes it to the processing analysis server 420 of the identification information P1. While a particular data flag is added to the processing request "c" in this example, it is also possible to add a particular data flag to ID=2 in the processing request "c".

The processing analysis server 420, which received the processing request "c" from the distribution device 440, checks presence or absence of a particular data flag, and as there is a particular data flag, the processing analysis server 420 executes processing on the data stored in the particular data storage unit 4233 and the copy data storage unit 4232 of the own server, regardless of the previously processed data.

As described above, the present embodiment includes the distribution device 440 which distributes processing requests transmitted from the clients to a plurality of processing analysis servers in such a manner that a processing request which uses particular data is distributed to a particular processing analysis server. As such, comparing with a configuration in which an arbitrary client transmits a processing request to an arbitrary processing analysis server, it is possible to reduce wasteful cache update in the processing analysis servers.

Further, according to a configuration having a plurality of distribution devices 440, it is possible to distribute processing loads from clients.

Fifth Exemplary Embodiment

A distributed processing system according to the present embodiment only differs from the distributed processing system of the fourth exemplary embodiment in the functions of a distribution device.

Figure 20:
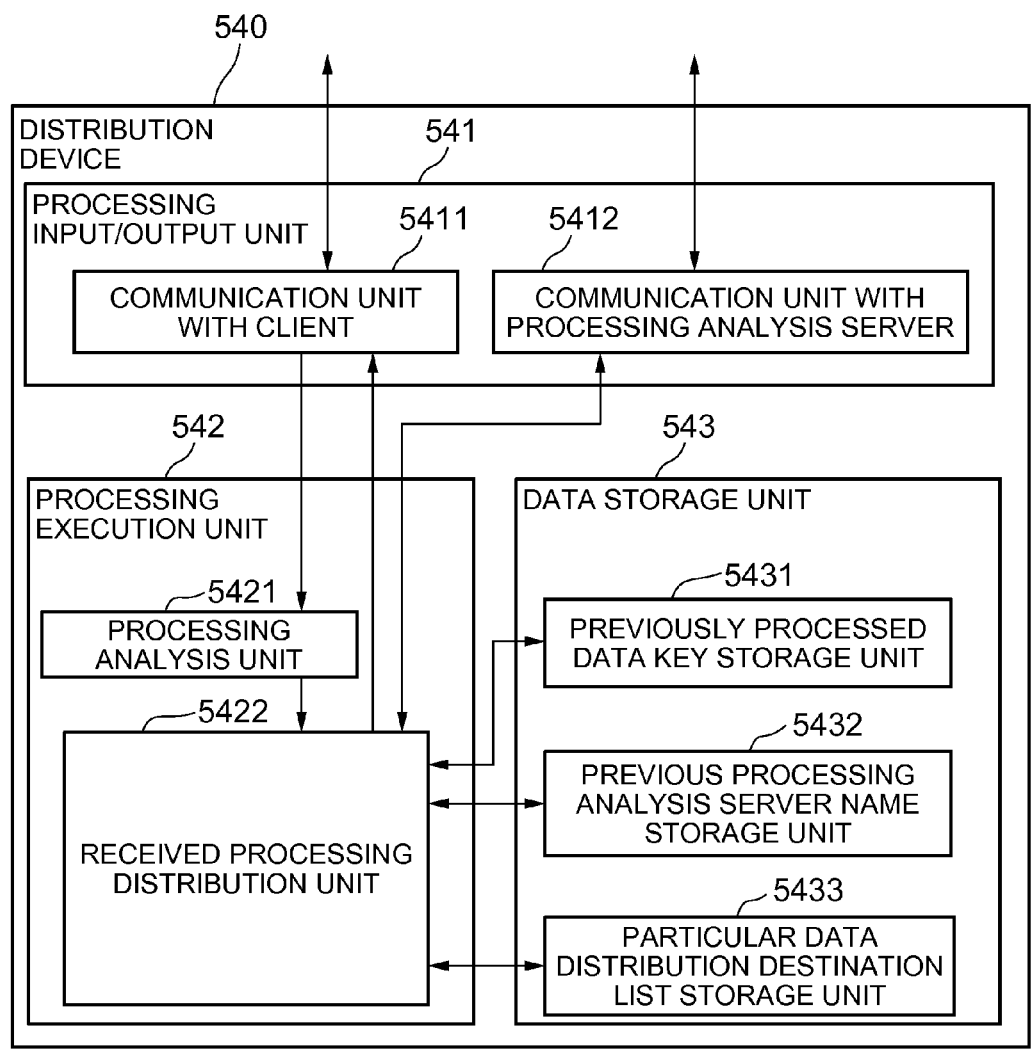
FIG. 20 is a block diagram of a distribution device according to a fifth exemplary embodiment of the present invention.

FIG. 20 is a block diagram of a distribution device 540 according to the present embodiment. Referring to FIG. 20, the distribution device 540 includes a processing input/output unit 541, a processing execution unit 542, and a data storage unit 543. The processing input/output unit 541 includes a communication unit 5411 with clients, and a communication unit 5412 with processing analysis servers, and performs transmission and reception of processing requests and data with all of the clients 410 and the processing analysis servers 420. The processing execution unit 542 includes a processing analysis unit 5421 which analyzes a received processing request, and a received processing distribution unit 5422 which distributes a received processing request to any one of the processing analysis servers 420. The data storage unit 543 includes a previously processed data key storage unit 5431, a previous processing analysis server name storage unit 5432, and a particular data distribution destination list storage unit 5433.

The previously processed data key storage unit 5431 and the previous processing analysis server name storage unit 5432, included in the data storage unit 543, are the same as the previously processed data key storage unit 3431 and the previous processing analysis server name storage unit 3432 included in the distribution device 340 of the third exemplary embodiment shown in FIG. 12. Further, the particular data distribution destination list storage unit 5433 included in the data storage unit 543 is the same as the particular data distribution destination list storage unit 4433 included in the distribution device 440 of the fourth exemplary embodiment shown in FIG. 15.

Figure 21:
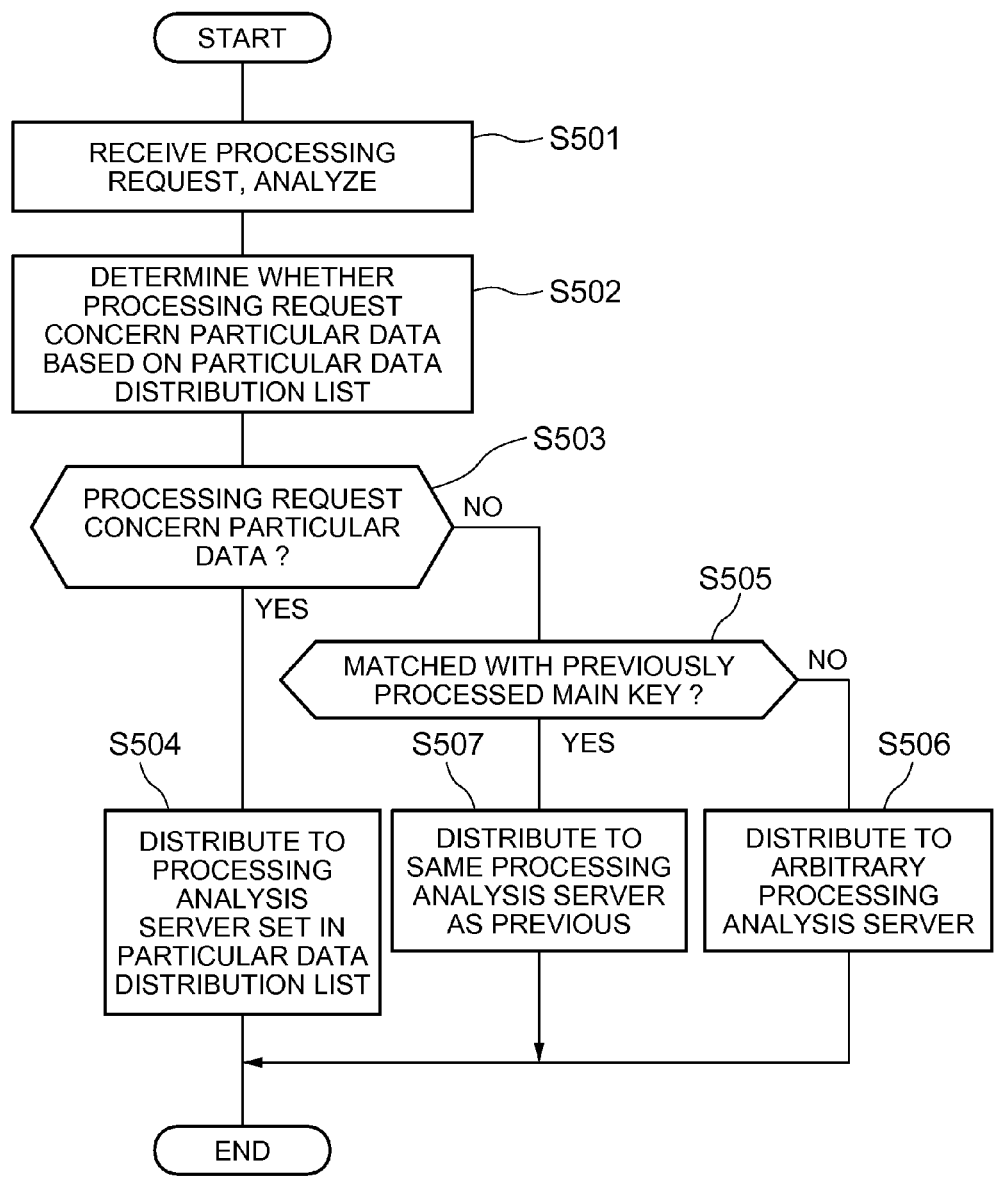
FIG. 21 is a flowchart showing an operation of the distribution device according to the fifth exemplary embodiment of the present invention.

FIG. 21 is a flowchart showing the operation of the distribution device 540. The processing analysis unit 5421 of the distribution device 540 receives a processing request from any of the clients 410, and analyzes the main key of the data to be used, presence or absence of a particular data flag, and the like (step S501). Then, based on the analysis result, the received processing distribution unit 5422 of the distribution device 540 determines whether or not the data to be used in the processing request is particular data (step S502). Specifically, the received processing distribution unit 5422 reads a particular data distribution destination list from the storage unit 5431, and collates the main key of particular data described in the list with the main key of the data to be used in the currently received processing request, in order from the top of the list. As a result of collation, if the data to be used in the currently received processing request is particular data described in the particular data distribution destination list (YES at step S503), the received processing distribution unit 5422 adds a particular data flag to the processing request, and distributes the currently received processing request to the processing analysis server 420 set in the particular data distribution destination list (step S504). At this time, the received processing distribution unit 5422 stores the main key of the data to be used in the currently received processing request in the previously processed data key storage unit 5431, and stores the name of the processing analysis server 420, which is the current distribution destination, in the previous processing analysis server name storage unit 5432.

On the other hand, as a result of collation, if it is determined that the processing request is not the one with respect to particular data, the received processing distribution unit 5422 reads the main key of the data used in the previously processed processing request from the previously processed data key storage unit 5431, and compares it with the main key of the data to be used in the currently received processing request (step S505). As a result of comparison, if they do not match, the received processing distribution unit 5422 distributes the currently received processing request to any one of the processing analysis servers 420 (step S506). At this time, the received processing distribution unit 5422 stores the main key of the data to be used in the currently received processing request in the previously processed data key storage unit 5431, and stores the name of the processing analysis server 420, which is the current distribution destination, in the previous processing analysis server name storage unit 5432. On the other hand, as a result of comparison, if they match, the received processing distribution unit 5422 refers to the previous processing analysis server name storage unit 5432 and confirms the processing analysis server 420 as the previous distribution destination, and distributes the currently received processing request to this processing analysis server 420 (step S507). At steps S506 and S507, when distributing the processing request to the processing analysis server 420, the received processing distribution unit 5422 does not add a particular data flag to the processing request.

As the present embodiment includes the distribution device 540 which distributes processing requests transmitted from the clients to a plurality of processing analysis servers in such a manner that a processing request which uses particular data is distributed to a particular processing analysis server, and as for processing requests which use data other than particular data, a plurality of processing requests in which the main key of the data to be used is the same are distributed continuously to the same processing analysis server. As such, comparing with a configuration in which an arbitrary client transmits a processing request to an arbitrary processing analysis server, it is possible to reduce wasteful cache update in the processing analysis servers.

According to the exemplary embodiments described above, it is possible to reduce both the cost for cache update and the cost for re-execution of a transaction while keeping scalability.

The present invention is suitable for a distributed processing system configured to perform high-speed processing on a large amount of data while maintaining data consistency, that is, a system configured to execute transactions using a distributed key value store, in particular, a distributed database system in which a large amount of stream is generated, and a distributed database system in which high-speed processing is required.

REFERENCE NUMERALS

100 distributed processing system
110 client device
120 server device
121 cache
122 identification information holding unit
123 transaction execution unit
130 persistent storage device
131 data

The invention claimed is:
1. A distributed processing system comprising:
a client device configured to transmit a transaction;
a persistent storage device configured to store data; and
a server device configured to control execution of the transaction received from the client device based on optimistic exclusion, wherein
the server device includes:
a cache configured to hold the data acquired from the persistent storage device;
a memory storing instructions; and
at least one processor configured to process the instructions to implement:
an identification information holding unit configured to hold identification information of the data; and
a transaction execution unit configured to sequentially execute a plurality of transactions received from the client device,
wherein the at least one processor is configured to process the instructions to control the transaction execution unit to:
compare, before executing each of the transactions, identification information of data to be used in execution of the transaction with the identification information of the data held in the identification information holding unit,
if a comparison result shows a mismatch, after performing cache update by acquiring the data to be used in the execution of the transaction from the persistent storage device and storing the data in the cache, execute the transaction by using the data in the cache,
if the comparison result shows a match, execute the transaction by using the data in the cache without performing the cache update,
after executing each of the transactions, determine whether or not optimistic exclusion succeeded,
when the optimistic exclusion succeeded, commit the transaction, and record, in the identification information holding unit, identification information of the data used in the execution of the transaction, and
when the optimistic exclusion failed, after performing the cache update by acquiring the data to be used in the execution of the transaction from the persistent storage device to store the data in the cache, re-execute the transaction by using the data in the cache.

2. The distributed processing system according to claim 1, wherein
the persistent storage device is configured to store version information of the data, and
the transaction execution unit is configured, when determining whether or not the optimistic exclusion succeeded, check whether or not the version information of the data used in the transaction is same at an execution start time and at an execution end time of the transaction.

3. The distributed processing system according to claim 2, wherein
in the cache update performed due to the failure in the optimistic exclusion, the transaction execution unit is configured to acquire the data in the persistent storage device, which differs from the data in the cache, of the data required for the execution of the the transaction to be re-executed.

4. The distributed processing system according to claim 1, further comprising
a distribution device provided between the client device and the server device, the distribution device being configured to receive the transaction from the client device and distribute the received transaction to the server device.

5. The distributed processing system according to claim 4, wherein
when distributing, the distribution device is configured to distribute the transaction which uses particular data to a particular server device.

6. The distributed processing system according to claim 4, wherein
when distributing, the distribution device is configured to distribute the transactions, in which identification information of the data to be used is the same, to the same server device continuously.

7. The distributed processing system according to claim 4, wherein
when distributing, the distribution device is configured to distribute the transaction which uses particular data to a particular server device, and as for the transactions which use the data other than the particular data, distribute the transactions, in which identification information of the data to be used is the same, to the same server device continuously.

8. The distributed processing system according to claim 1, wherein
the data includes a key and a value, and
the identification information of the data is the key.

9. A server device connected with a client device that transmits a transaction and a persistent storage device that stores data, the server device being configured to control execution of the transaction received from the client device based on optimistic exclusion, the server device comprising:
a cache configured to hold the data acquired from the persistent storage device;
a memory storing instructions; and
at least one processor configured to process the instructions to implement:
an identification information holding unit configured to hold identification information of the data; and
a transaction execution unit configured to sequentially execute a plurality of transactions received from the client device, wherein
the at least one processor is configured to process the instructions to control the transaction execution unit to:
before executing each of the transactions, compare identification information of data to be used in execution of the transaction with the identification information of the data held in the identification information holding unit,
if a comparison result shows a mismatch, after performing cache update by acquiring the data to be used in the execution of the transaction from the persistent storage device and storing the data in the cache, the transaction execution unit executes the transaction by using the data in the cache, that
if the comparison result shows a match, the transaction execution unit executes the transaction by using the data in the cache without performing the cache update, that
after executing each of the transactions, the transaction execution unit determines whether or not optimistic exclusion succeeded, that
when the optimistic exclusion succeeded, the transaction execution unit commits the transaction, and records, in the identification information holding unit, identification information of the data used in the execution of the transaction, and that
when the optimistic exclusion failed, after performing the cache update by acquiring the data to be used in the execution of the transaction from the persistent storage device to store the data in the cache, the transaction execution re-executes the transaction by using the data in the cache.

10. The server device according to claim 9, wherein
the persistent storage device is configured to store version information of the data,
the transaction execution unit is configured to, when determining whether or not the optimistic exclusion succeeded, check whether or not the version information of the data used in the transaction is same at an execution start time and at an execution end time of the transaction.

11. The server device according to claim 10, wherein
in the cache update performed du to the failure in the optimistic exclusion, the transaction execution unit acquires the data in the persistent storage device, which differs from the data in the cache, of the data required for the execution of transaction to be re-executed.

12. The server device according to claim 9, wherein
the data includes a key and a value, and
the identification information of the data is the key.

13. A transaction execution method performed by a server device connected with a client device configured to transmit a transaction and a persistent storage device configured to store data, the server device including a cache configured to hold the data acquired from the persistent storage device and an identification information holding unit that holds identification information of the data, the server device being configured to control execution of the transaction received from the client device based on optimistic exclusion, the method comprising:
before executing each of the transactions, comparing identification information of data to be used in execution of the transaction with the identification information of the data held in the identification information holding unit;
if a comparison result shows a mismatch, after performing cache update by acquiring the data to be used in the execution of the transaction from the persistent storage device and storing the data in the cache, executing the transaction by using the data in the cache;
if the comparison result shows a match, executing the transaction by using the data in the cache without performing the cache update;
after executing each of the transactions, determining whether or not optimistic exclusion succeeded,
when the optimistic exclusion succeeded, committing the transaction, and recording, in the identification information holding unit, identification information of the data used in the execution of the transaction; and when the optimistic exclusion failed, after performing the cache update by acquiring the data to be used in the execution of the transaction from the persistent storage device to store the data in the cache, re-executing the transaction by using the data in the cache.

14. The transaction execution method according to claim 13, further comprising when determining whether or not the optimistic exclusion succeeded, checking whether or not the version information of the data used in the transaction is same at an execution start time and at an execution end time of the transaction.

15. The transaction execution method according to claim 14, wherein the performing the cache update due to the failure in the commit includes acquiring the data in the persistent storage device, which differs from the data in the cache, of the data required for the execution of the transaction to be re-executed.

16. The transaction execution method according to claim 13, wherein the data includes a key and a value, and the identification information of the data is the key.

17. A non-transitory computer readable medium storing a program comprising instructions for causing a computer to function as, the computer being connected with a client device that transmits a transaction and a persistent storage device that stores data, the computer being configured to control execution of the transaction received from the client device based on optimistic exclusion:

a cache configured to hold the data acquired from the persistent storage device;

an identification information holding unit configured to hold identification information of the data; and a transaction execution unit configured to sequentially execute a plurality of transactions received from the client device, wherein the transaction execution unit is configured such that:

before executing each of the transactions, the transaction execution unit compares identification information of data to be used in execution of the transaction with the identification information of the data held in the identification information holding unit, if a comparison result shows a mismatch, after performing cache update by acquiring the data to be used in the execution of the transaction from the persistent storage device and storing the data in the cache, the transaction execution unit executes the transaction by using the data in the cache, if the comparison result shows a match, the transaction execution unit executes the transaction by using the data in the cache without performing the cache update, after executing each of the transactions, the transaction execution unit determines whether or not optimistic exclusion succeeded, when the optimistic exclusion succeeded, the transaction execution unit commits the transaction, and records, in the identification information holding unit, identification information of the data used in the execution of the transaction, and when the optimistic exclusion failed, after performing the cache update by acquiring the data to be used in the execution of the transaction from the persistent storage device to store the data in the cache, the transaction execution re-executes the transaction by using the data in the cache.

* * * * *

UNITED STATES PATENT AND TRADEMARK OFFICE
CERTIFICATE OF CORRECTION

| | |
|---|---|
| PATENT NO. | : 10,284,649 B2 |
| APPLICATION NO. | : 14/893952 |
| DATED | : May 7, 2019 |
| INVENTOR(S) | : Hiroko Nagashima |

Page 1 of 1

It is certified that error appears in the above-identified patent and that said Letters Patent is hereby corrected as shown below:

In the Claims

Column 21, Line 11; In Claim 3, delete "the the" and insert --the-- therefor

Column 22, Line 33; In Claim 11, delete "du" and insert --due-- therefor

Column 22, Line 37; In Claim 11, after "of", insert --the--

Signed and Sealed this
Twenty-seventh Day of August, 2019

Andrei Iancu
*Director of the United States Patent and Trademark Office*